US010994350B2

(12) United States Patent
Van Grieken et al.

(10) Patent No.: US 10,994,350 B2
(45) Date of Patent: May 4, 2021

(54) JACKET LEG CUTTING TOOL

(71) Applicant: Heerema Marine Contractors Nederland SE, Leiden (NL)

(72) Inventors: Gerardus Cornelius Van Grieken, Leiden (NL); Johannes Christianus Jozef Heemskerk, Leiden (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 21 days.

(21) Appl. No.: 15/968,172

(22) Filed: May 1, 2018

(65) Prior Publication Data
US 2018/0318945 A1     Nov. 8, 2018

(30) Foreign Application Priority Data

May 3, 2017    (NL) ...................................... 2018836

(51) Int. Cl.
*B23D 57/00*     (2006.01)
*B23D 59/00*     (2006.01)
(Continued)

(52) U.S. Cl.
CPC .......... *B23D 57/0084* (2013.01); *B23B 35/00* (2013.01); *B23D 49/002* (2013.01); *B23D 59/00* (2013.01); *B23D 59/001* (2013.01); *E02B 17/00* (2013.01); *E21B 33/068* (2013.01); *B23B 41/00* (2013.01); *E02B 2017/0052* (2013.01); *E21B 15/02* (2013.01); *E21B 41/0007* (2013.01)

(58) Field of Classification Search
CPC .. B23D 57/0084; B23D 59/001; B23D 59/00; B23D 49/002; B23B 35/00; B23B 41/00; B23B 2017/0052; B23B 2215/72; B23B 2247/08; B23B 39/14; E21B 41/0007; E21B 15/02; E21B 33/068; E21B 29/12; E02B 17/00; E02B 2017/0052; E02B 17/0034

See application file for complete search history.

(56) References Cited

U.S. PATENT DOCUMENTS 5,154,643  A    10/1992  Catania et al.
6,827,145  B2 *  12/2004  Fotland .................. E21B 29/00
                                                  166/298

(Continued)

FOREIGN PATENT DOCUMENTS

WO    2013019959 A2    2/2013
WO    2015037985 A1    3/2015

OTHER PUBLICATIONS

United Kingdom Search Report dated Oct. 19, 2018 for Application No. GB1806889.0.

(Continued)

*Primary Examiner* — Rick K Chang
(74) *Attorney, Agent, or Firm* — Patterson + Sheridan, LLP

(57) ABSTRACT

A cutting system is used for cutting a hollow cylindrical support beam which forms part of a support structure of a sea platform. The cutting system comprises a fixating device to fixate the cutting system in an operation position around an outer wall of the support beam, and a drilling device to drill a series of through holes in the outer wall and around the support beam. The drilling device is movable along a drill track and around the support beam by a drill driver.

14 Claims, 20 Drawing Sheets

(51) Int. Cl.
*B23D 49/00* (2006.01)
*E02B 17/00* (2006.01)
*E21B 33/068* (2006.01)
*B23B 35/00* (2006.01)
B23B 41/00 (2006.01)
E21B 15/02 (2006.01)
E21B 41/00 (2006.01)

(56) References Cited

U.S. PATENT DOCUMENTS

| | | | | |
|---|---|---|---|---|
| 6,966,731 B2 * | 11/2005 | VanderPol | ................ | B23C 3/34 105/29.1 |
| 2009/0266552 A1 | 10/2009 | Barra et al. | | |
| 2010/0186564 A1 | 7/2010 | Pierce | | |

OTHER PUBLICATIONS

Netherland Search Report dated Jan. 3, 2018, corresponding to Application No. NL 2018836.

* cited by examiner

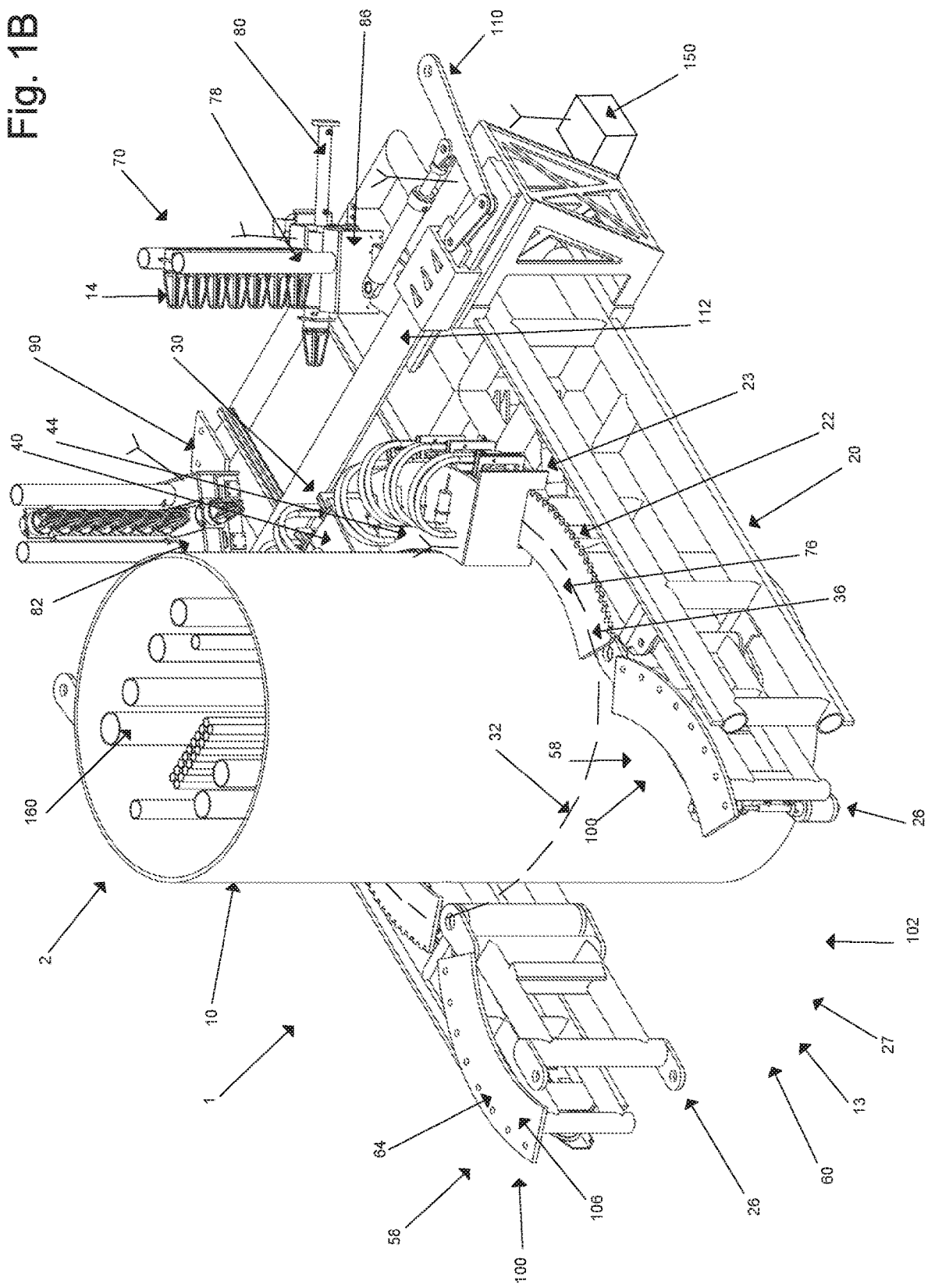

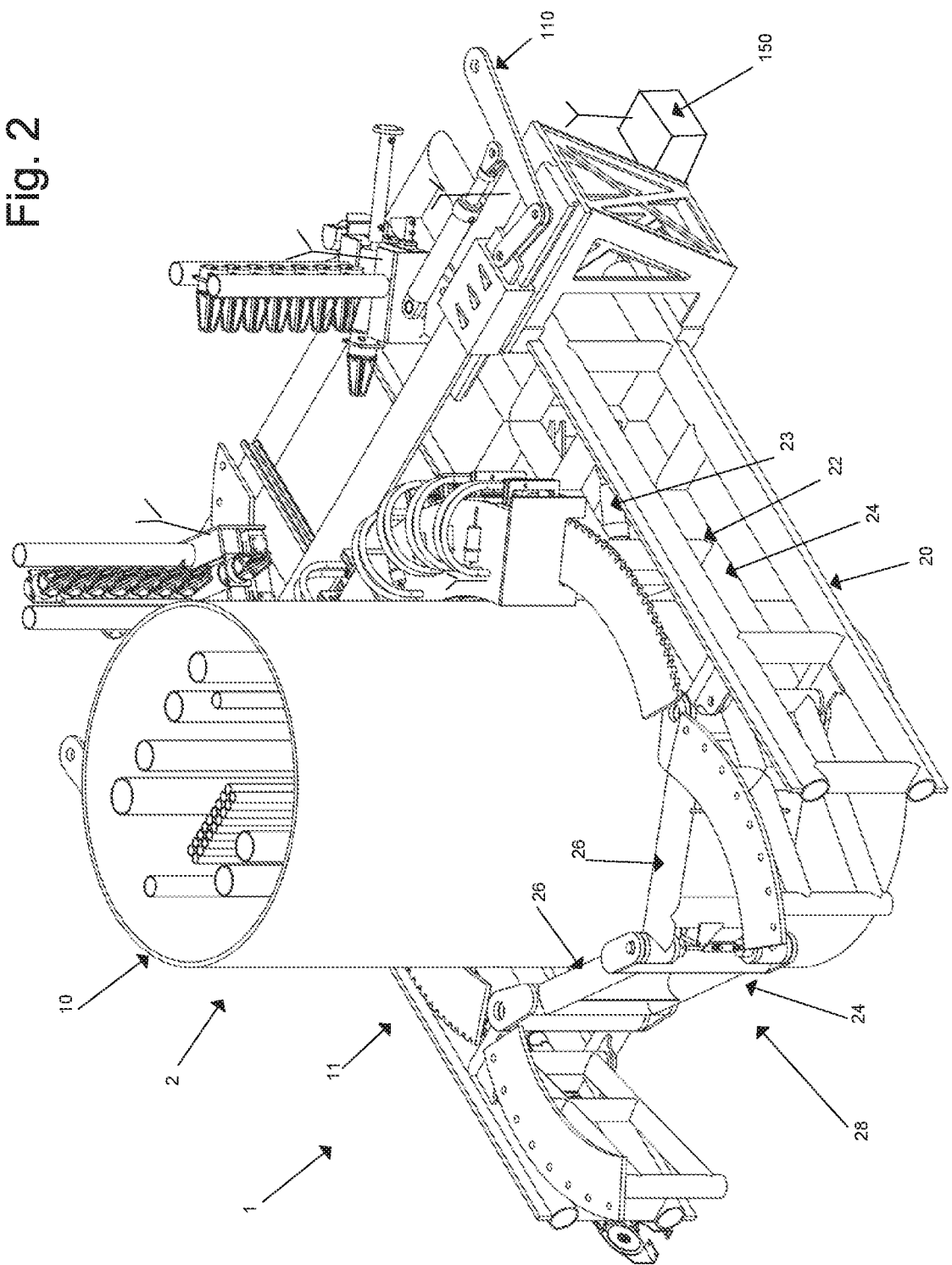

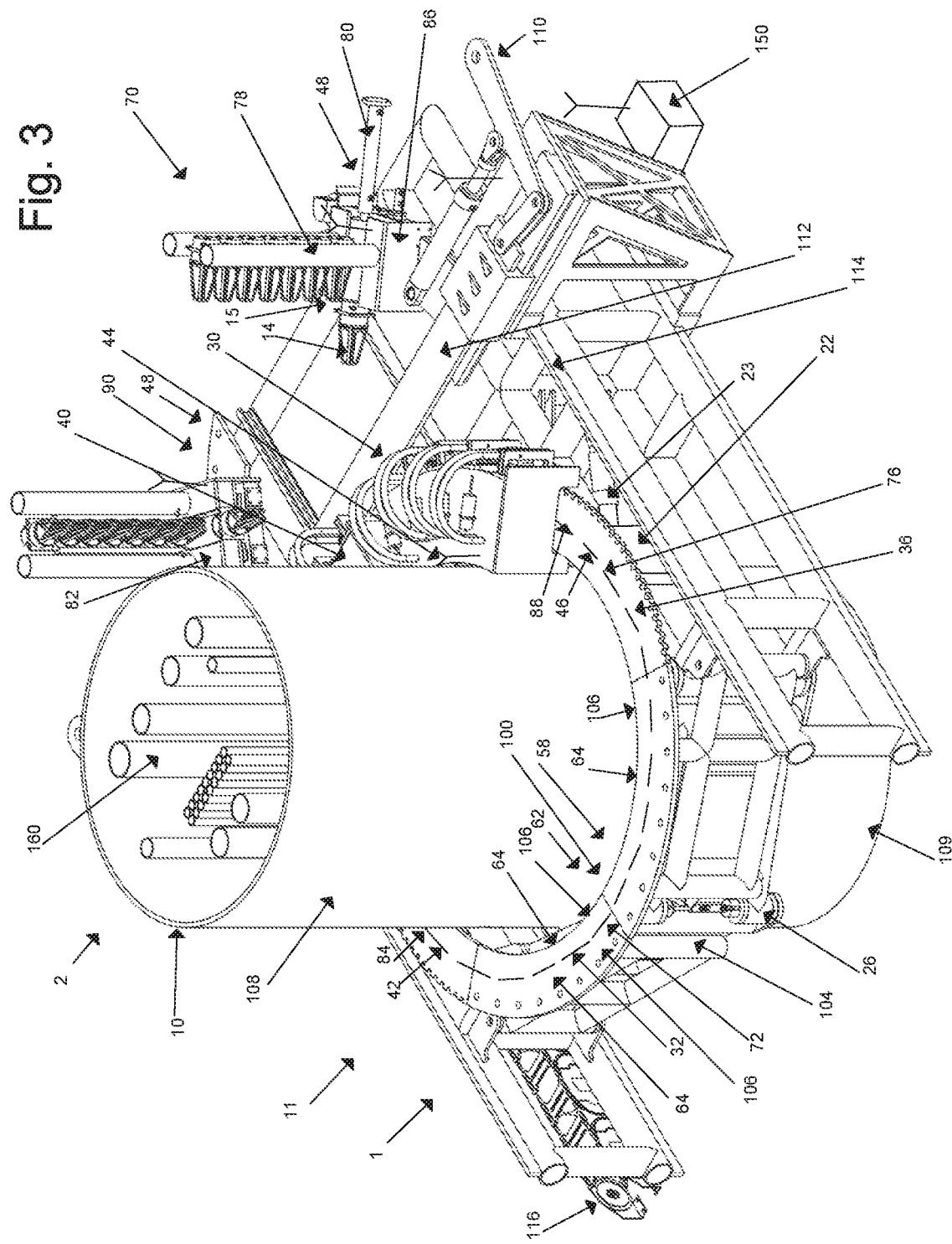

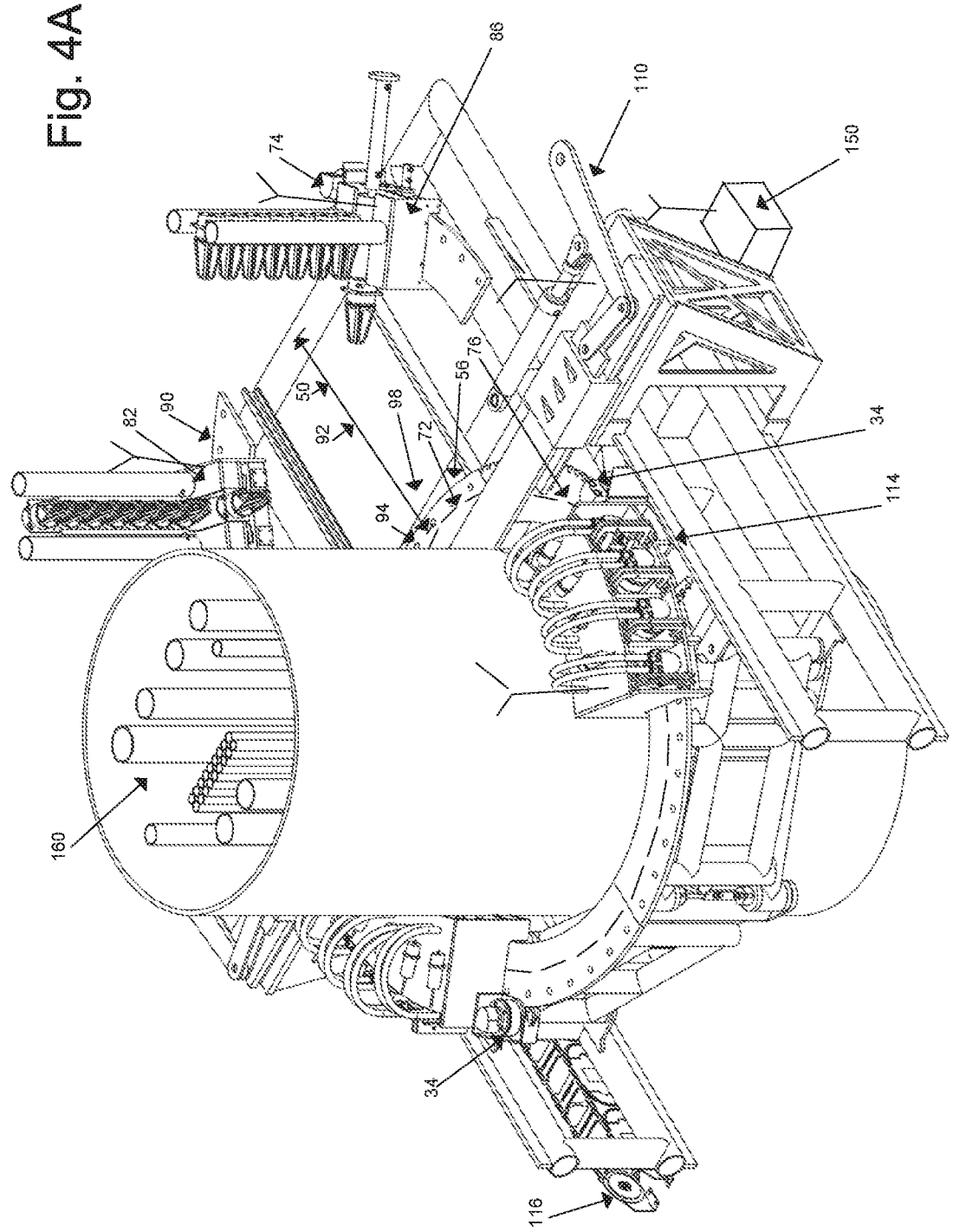

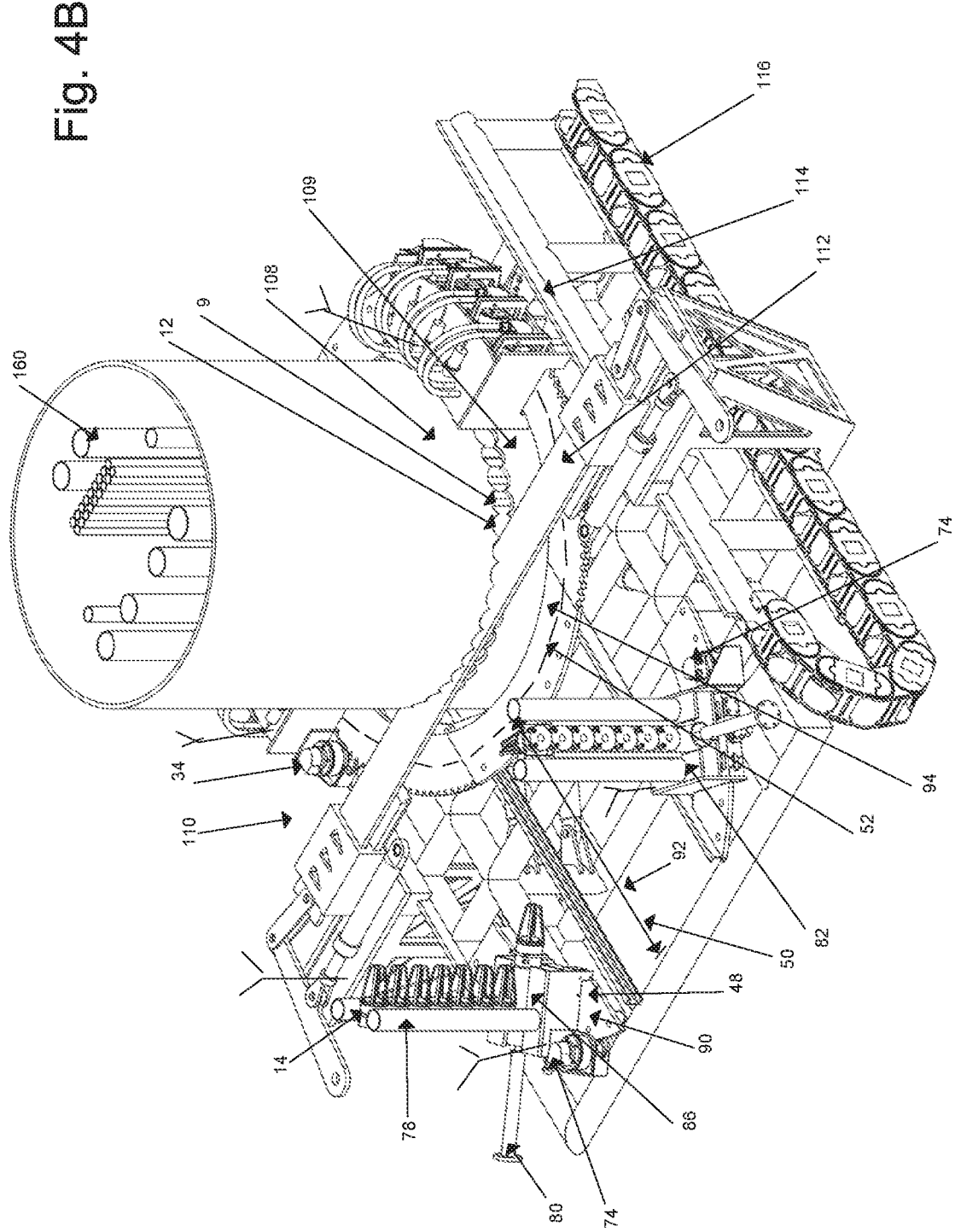

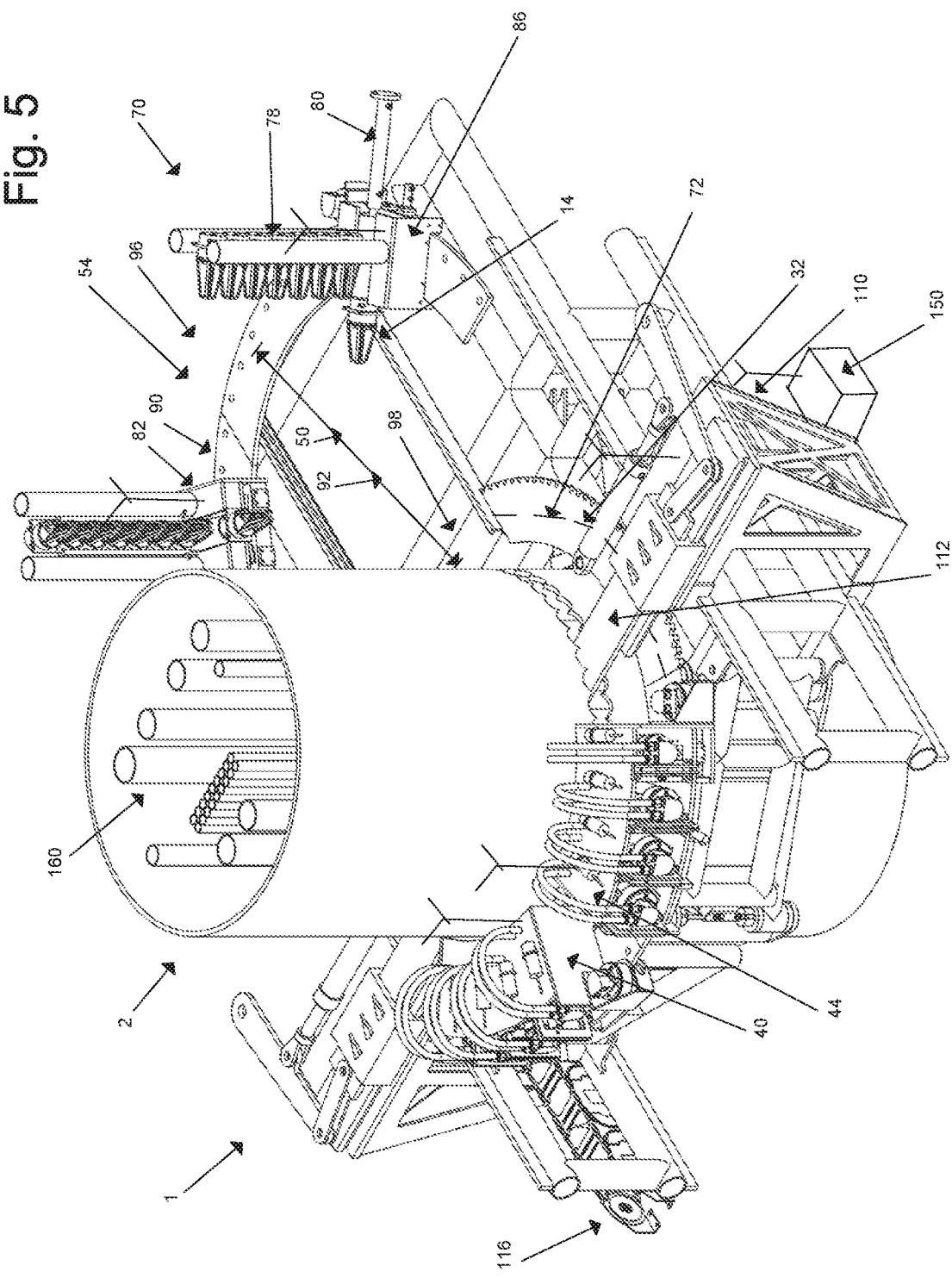

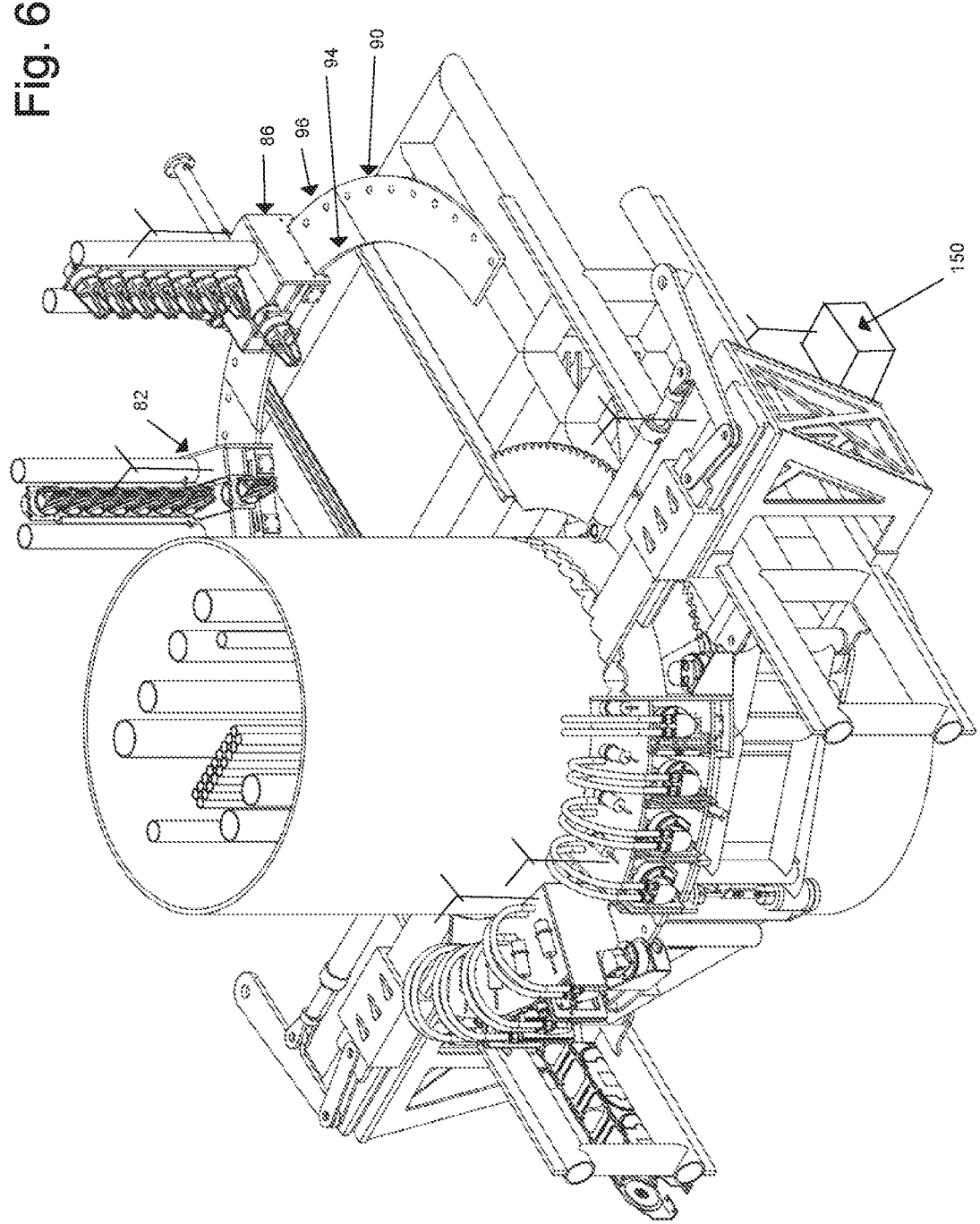

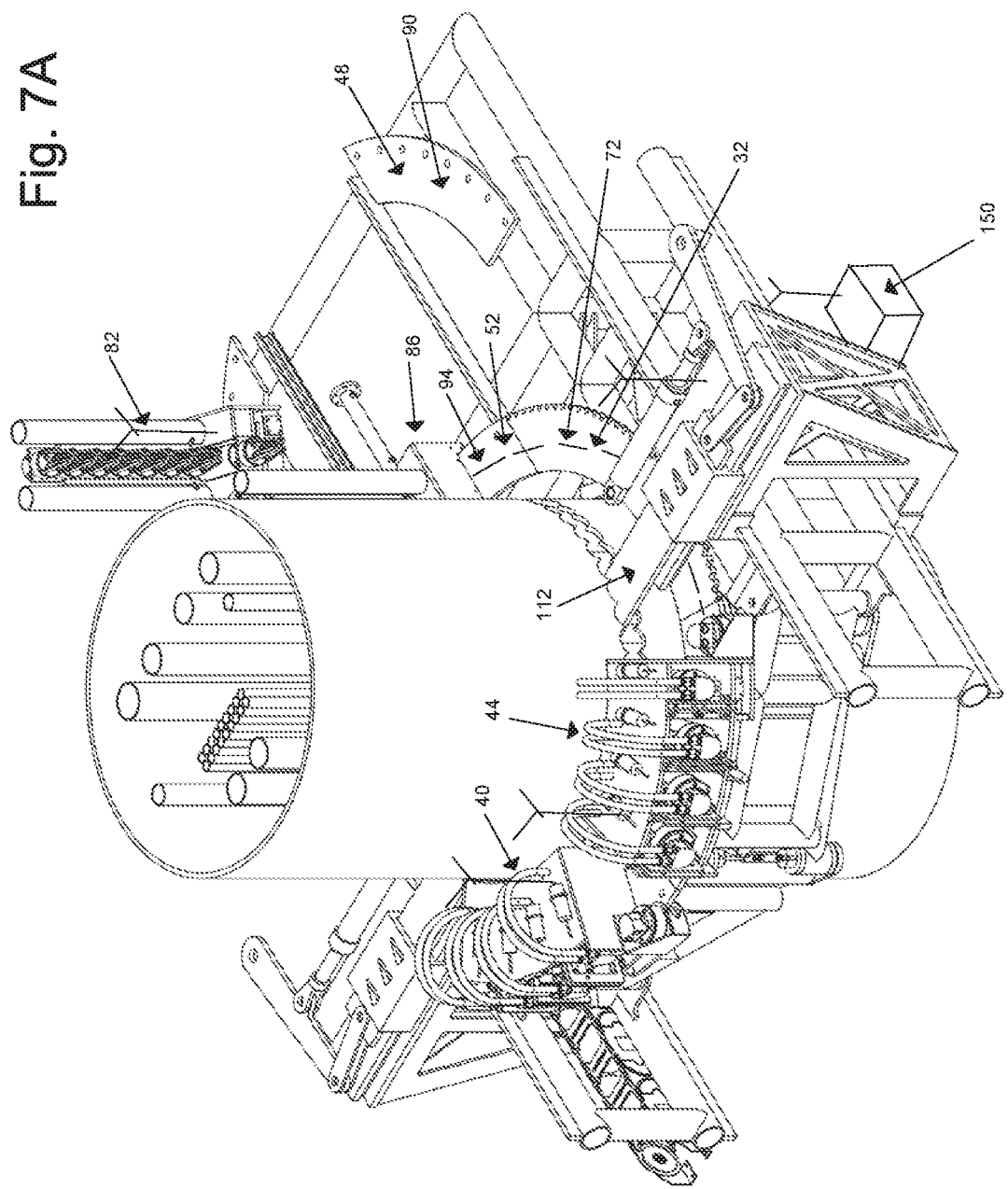

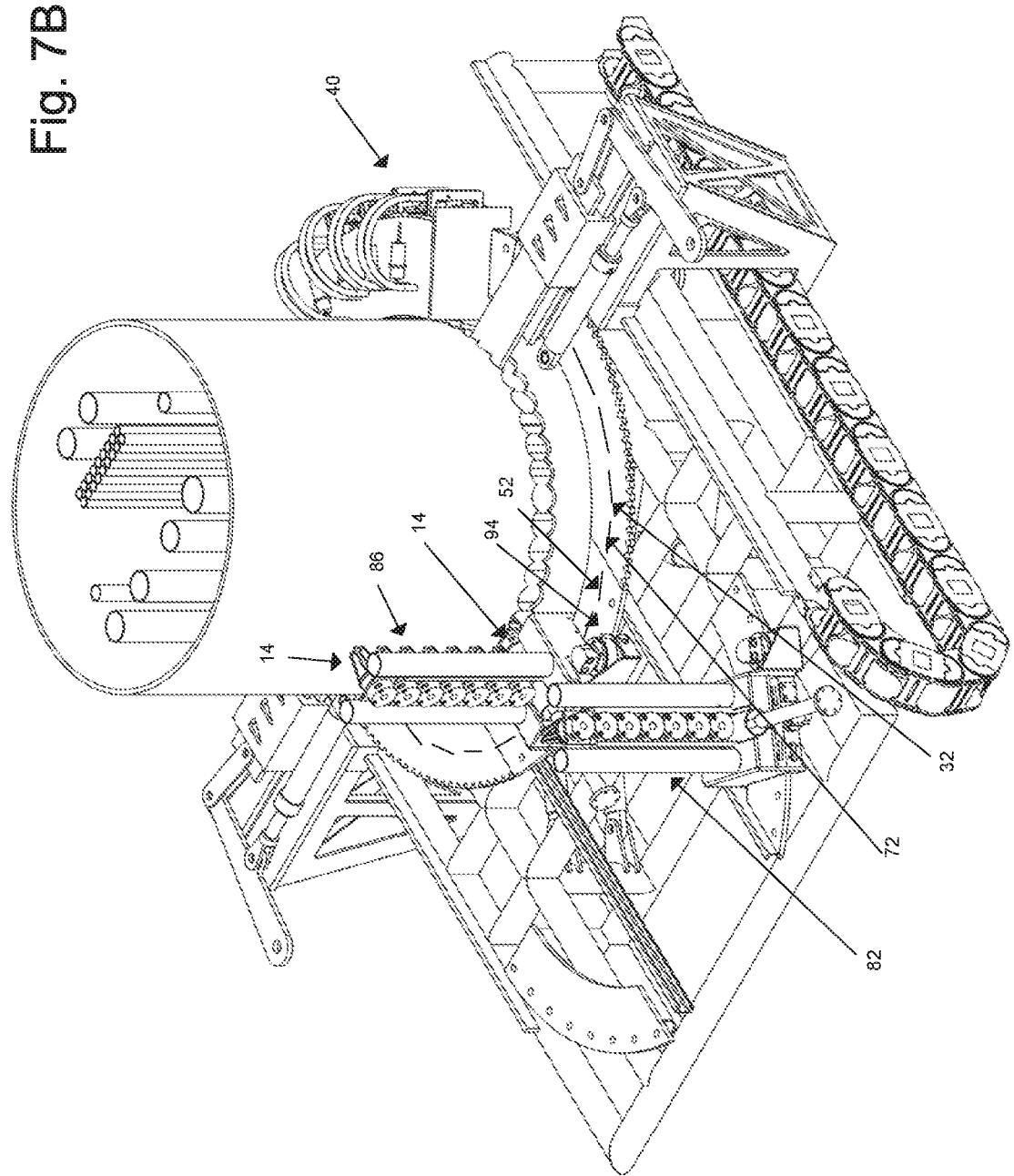

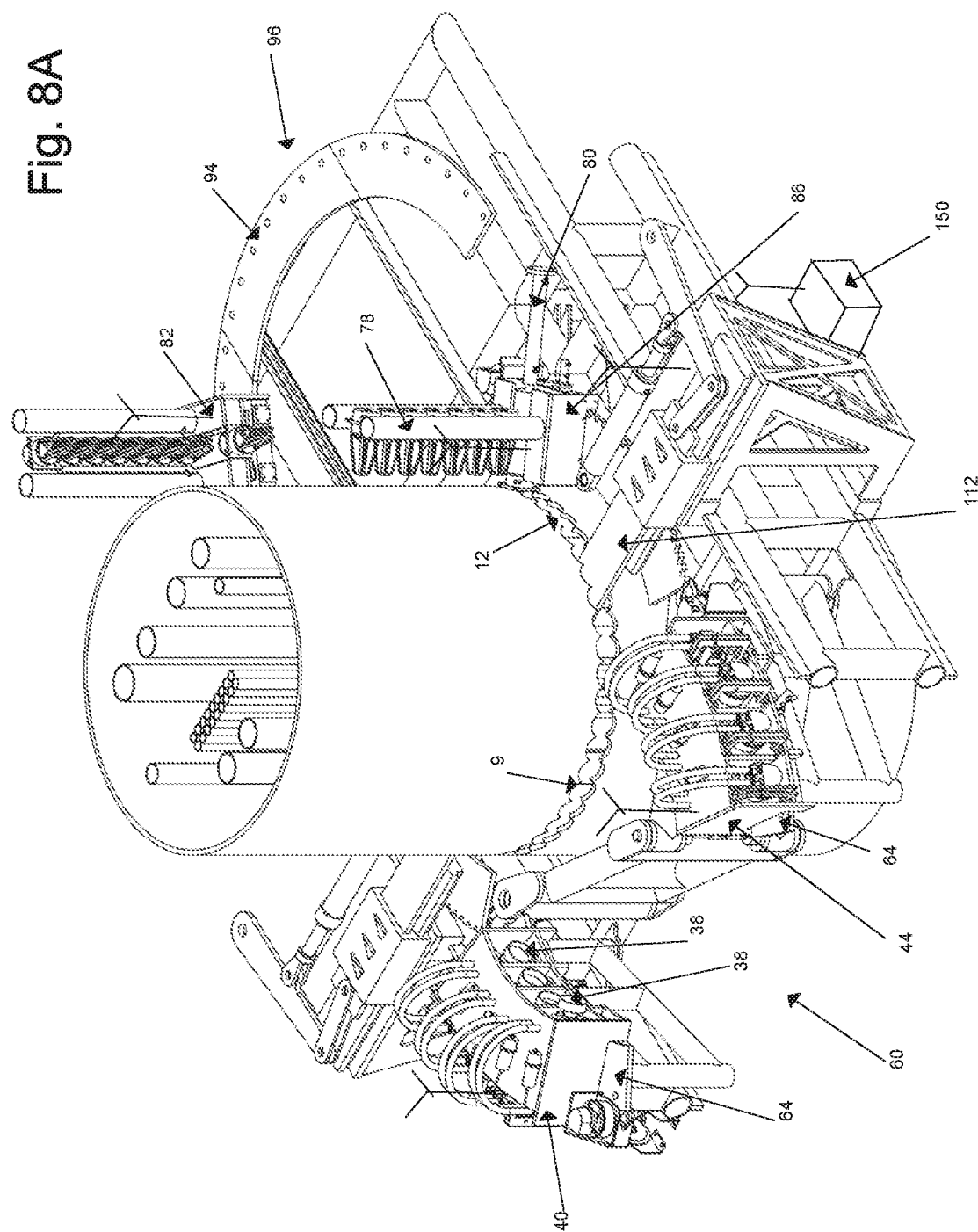

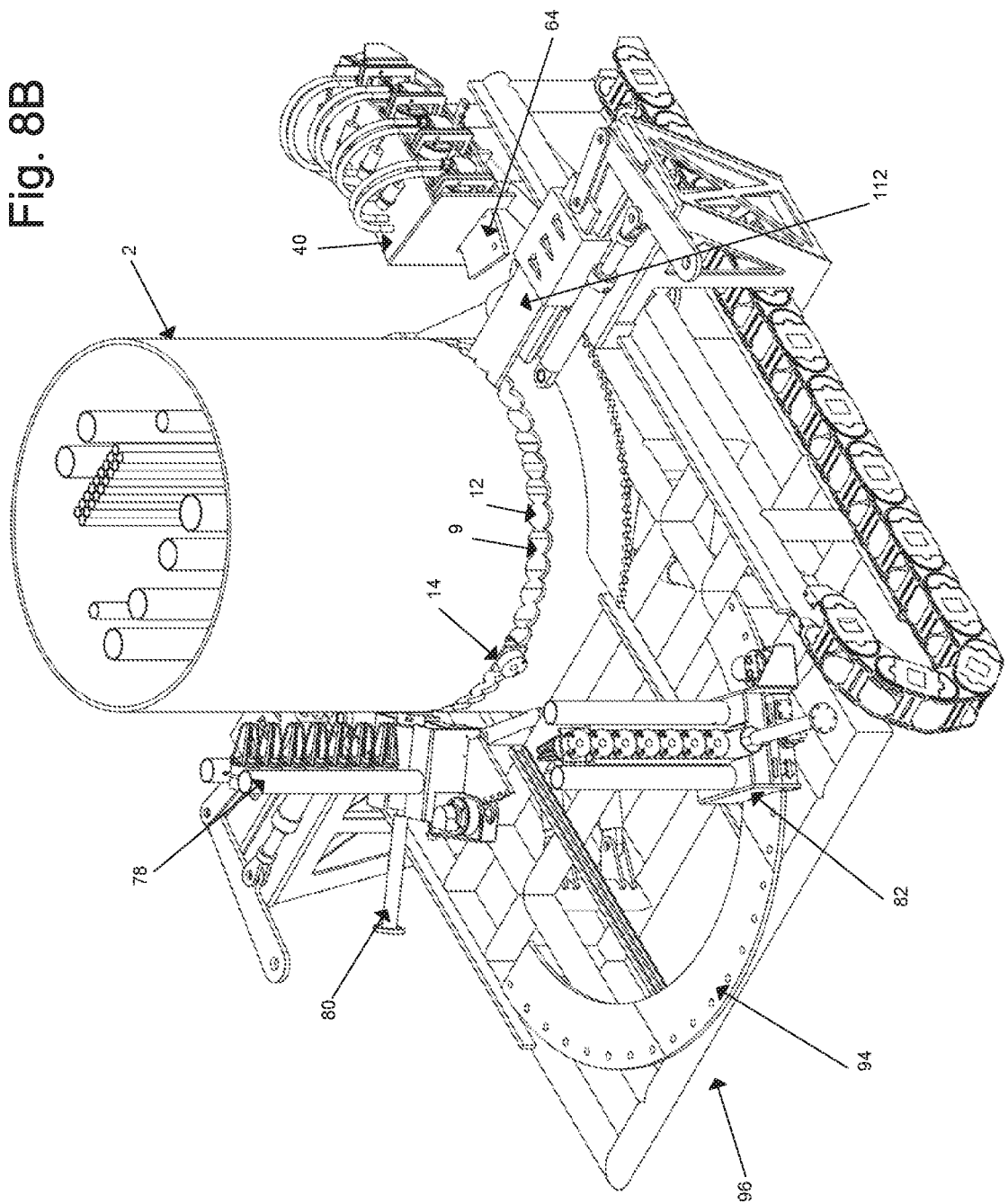

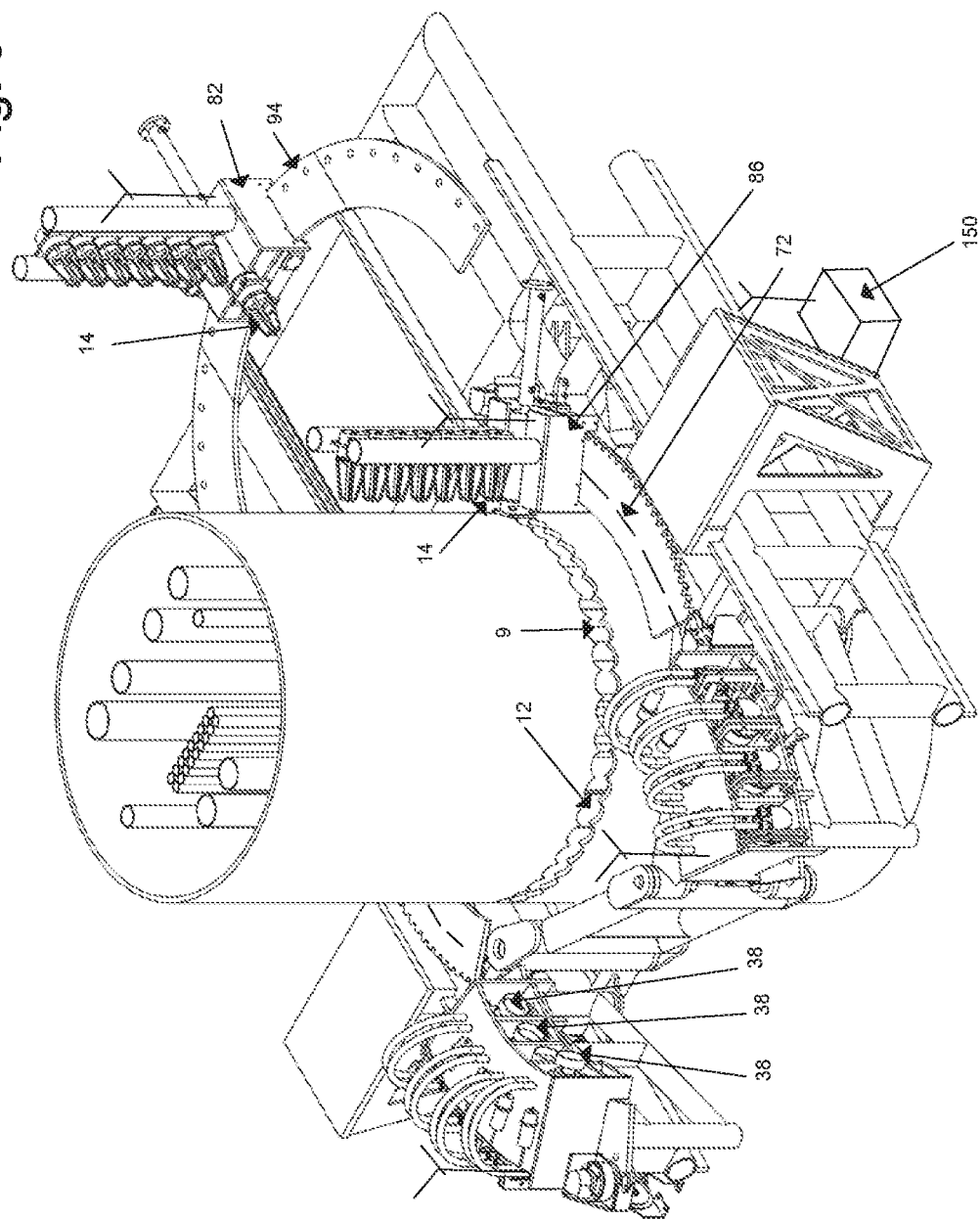

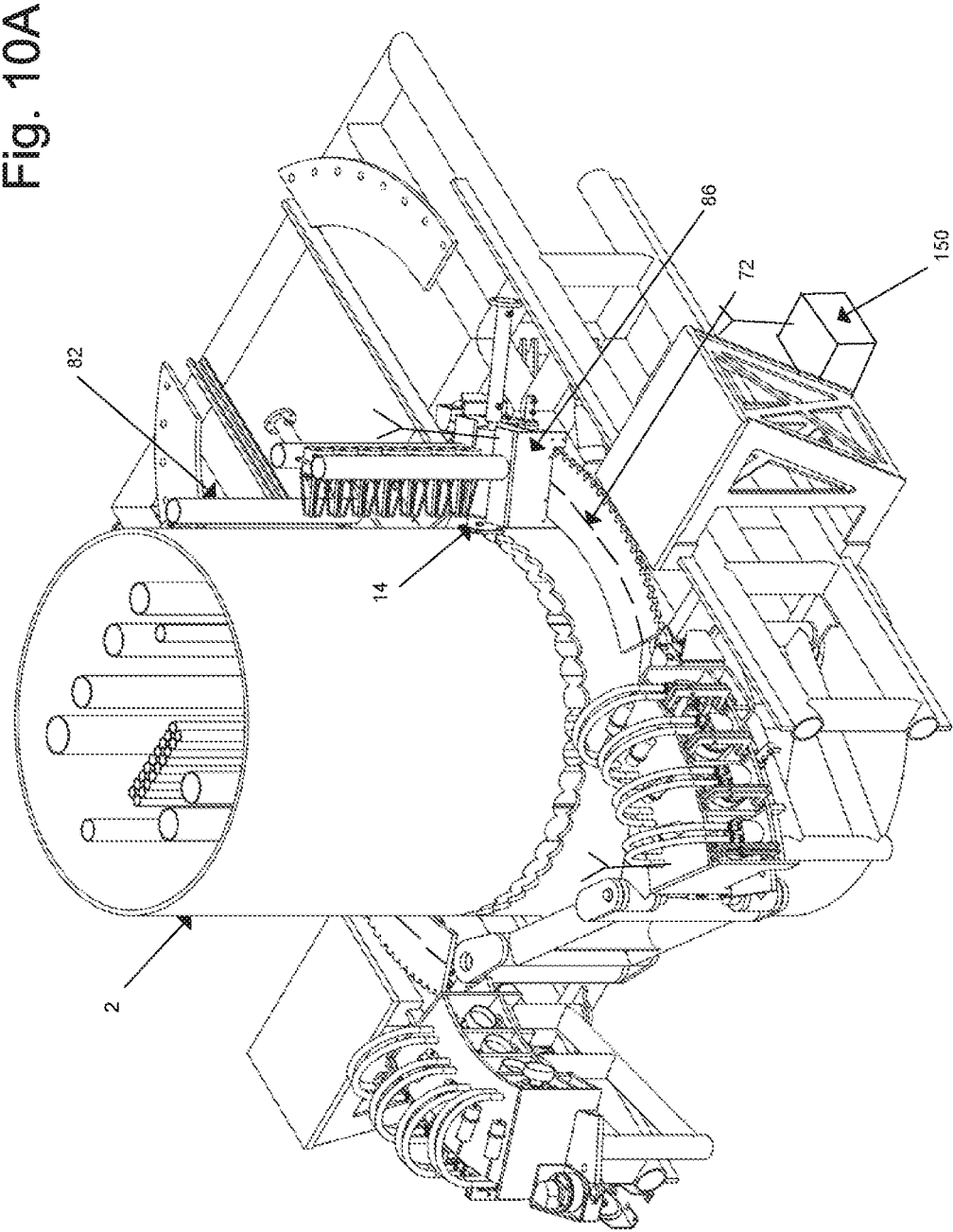

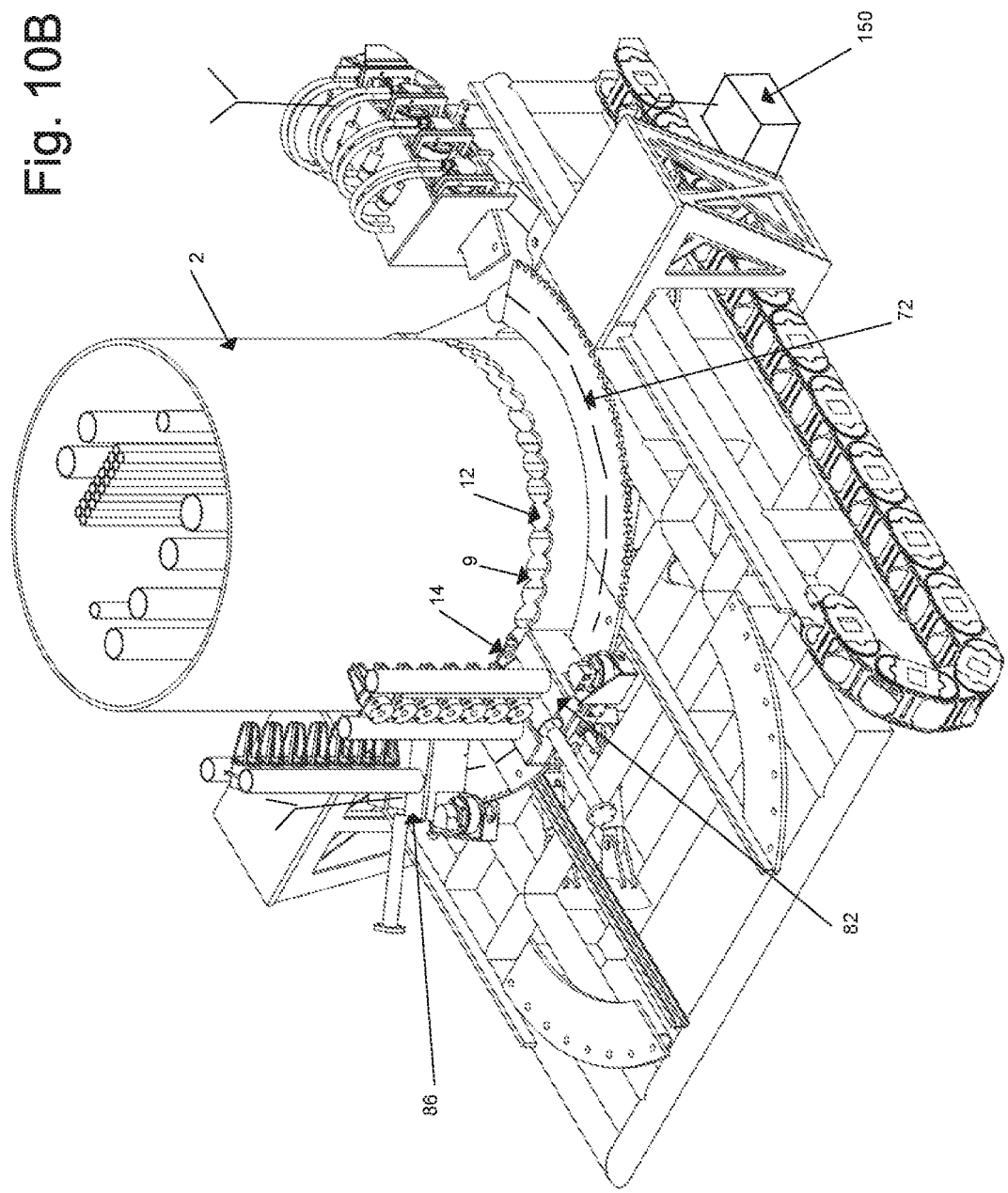

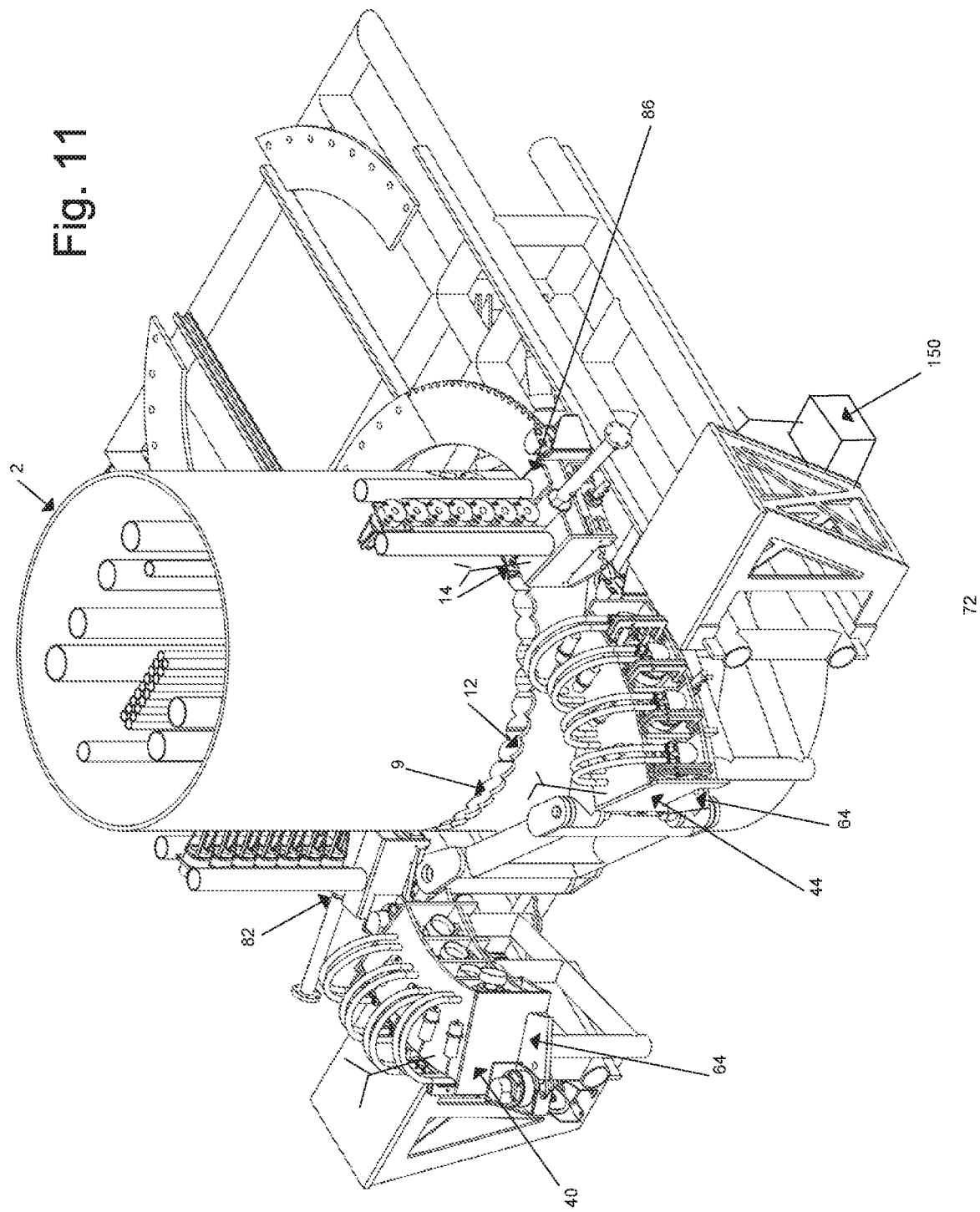

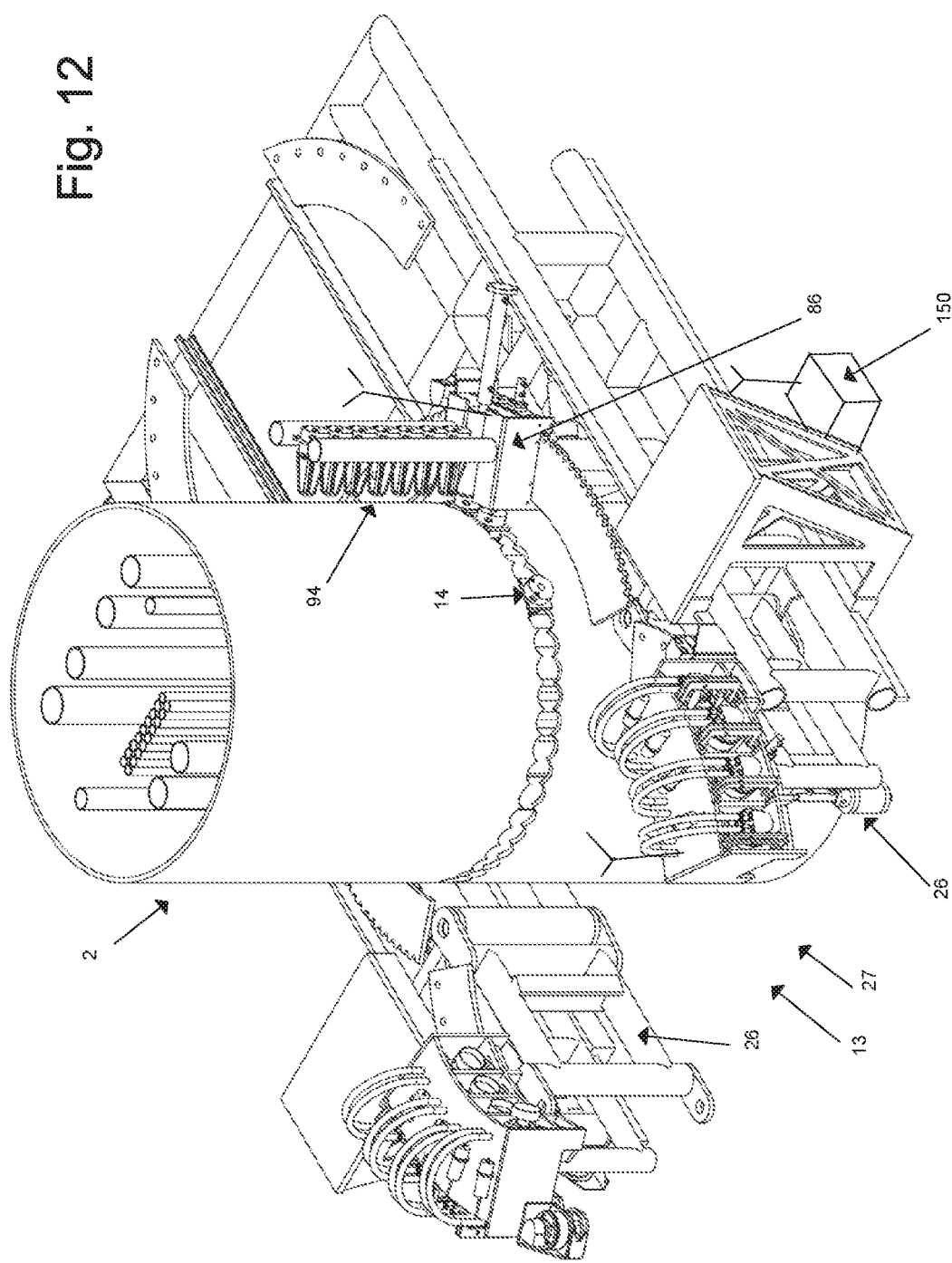

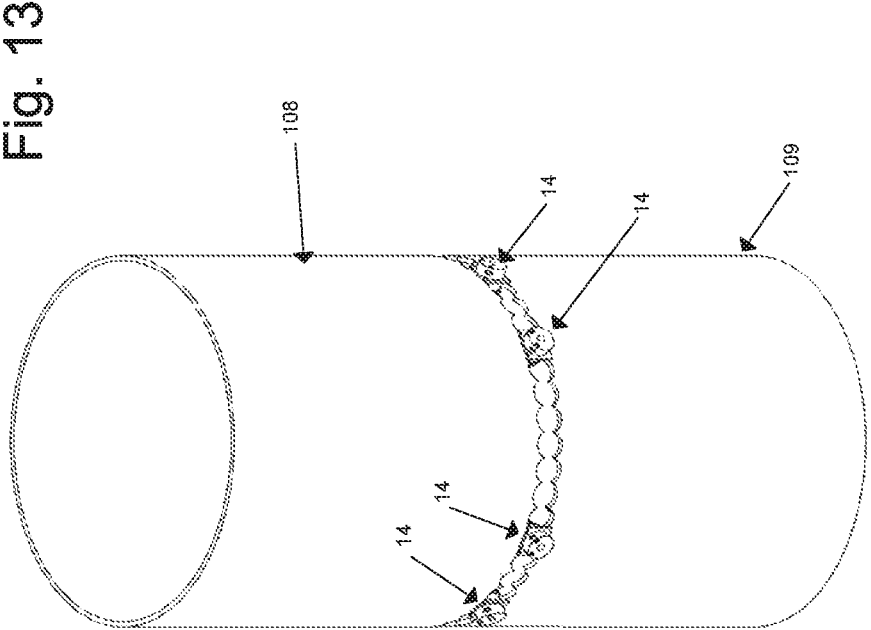

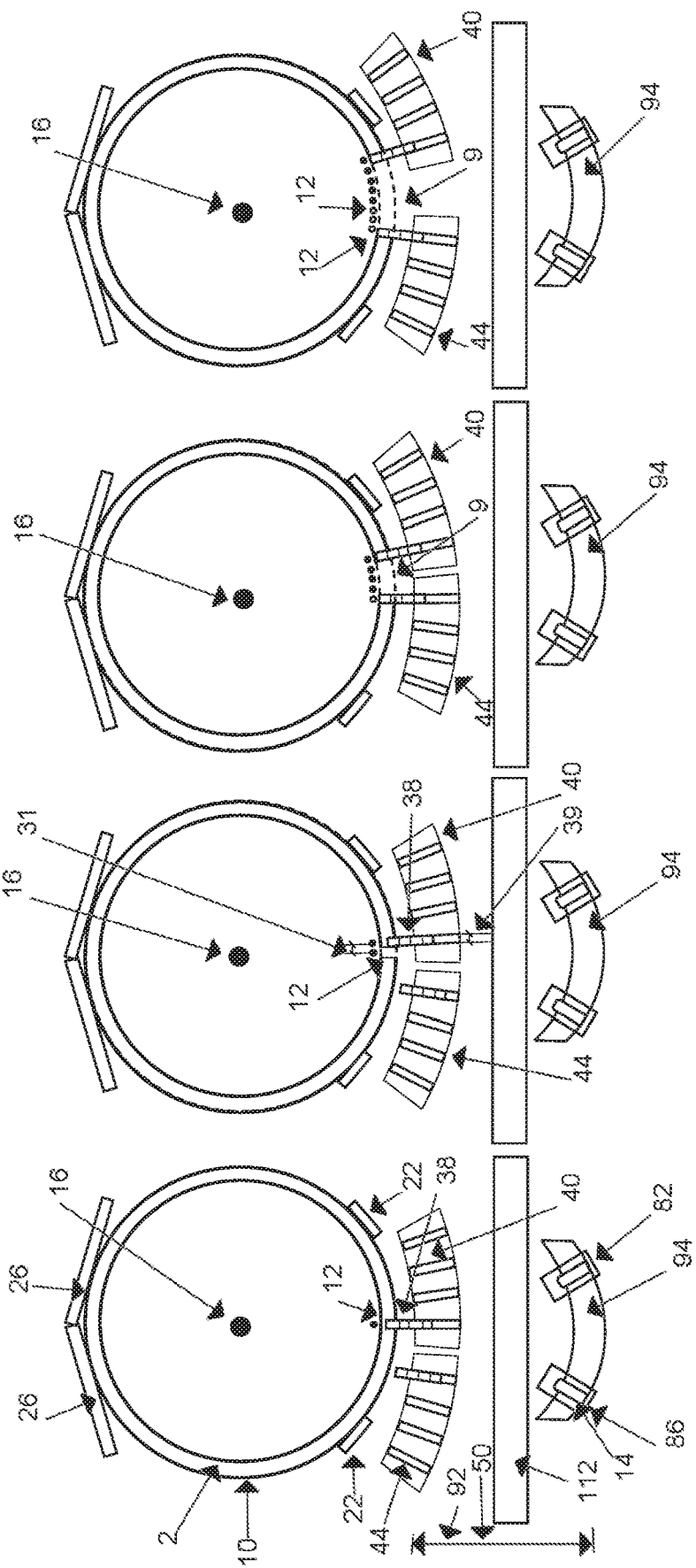

JACKET LEG CUTTING TOOL

CROSS-REFERENCE TO RELATED APPLICATIONS

This application claims benefit of Netherland patent application number 2018836, filed May 3, 2017 which is herein incorporated by reference in its entirety.

BACKGROUND

Field

The invention relates to a cutting system for cutting a hollow cylindrical support beam which forms part of a support structure of a sea platform. The invention further relates to a method for cutting the support beam.

Description of the Related Art

In the oil and gas industry it is known that immense quantities of fossil fuels are stored in offshore regions. In order to acquire the oil or gas the industry often uses offshore structures such as sea platforms. These sea platforms usually have a topside and a support structure. Most support structures contain hollow cylindrical beams that support the topside, so called support beams.

After the economic lifetime of the reservoir has ended, the sea platform needs to be removed. Removal is expensive. The contractors capable of removing offshore platforms have vessels with specialized equipment. These vessels have high day rates, so a fast removal is desired from a cost perspective.

One of the factors that determines the removal speed is the cutting time of the support beams. In the art known techniques for cutting support beams are diamond wire cutting, water jet cutting, and shear cutting. A drawback of these techniques is that they are relatively time consuming.

The invention is amongst others based on the insight that there is a need in the field of the art for a method of cutting such a support beam in an efficient matter.

SUMMARY

It is an object of the invention to provide an improved or alternative system for cutting a hollow cylindrical support beam which forms part of a support structure of a sea platform.

The present invention furthermore aims to provide an improved or alternative method for cutting a hollow cylindrical support beam which forms part of a support structure of a sea platform.

In order to achieve at least one object, the present invention provides a cutting system for cutting a hollow cylindrical support beam which forms part of a support structure of a sea platform, wherein the cutting system comprises a fixating device to fixate the cutting system in an operation position around an outer wall of the support beam, and a drilling device to drill a series of through holes in the outer wall and around the support beam, which drilling device is movable along a drill track and around the support beam by a drill driver.

The cutting system according to the invention allows that the cutting of the hollow cylindrical support beam is performed in an efficient manner.

In an embodiment of the cutting system, the cutting system comprises a control unit being in communication with the drilling device and the drill driver, and being programmed to start drilling the series of through holes with the drilling device and moving the drilling device along the drill track by the drill driver until the series of through holes around the support beam is finished.

In an embodiment of the cutting system, a spacer device configured to install spacers in a number of the through holes is provided, which spacer device is movable along a spacer track by a spacer driver. This embodiment was found to be very effective in providing stability to the jacket leg during and after cutting the jacket leg. The installed spacers support the jacket leg both vertically and horizontally.

In an embodiment of the cutting system, the drilling device is configured to drill the series of through holes along a straight cutting pattern. In an alternative embodiment of the cutting system, the drilling device is configured to drill the series of through holes along a castellation cutting pattern. Such a castellation cutting pattern tends to provide more horizontal resistance.

In an embodiment of the cutting system, the cutting system comprises a control unit being in communication with the drilling device, the drill driver, the spacer device, and the spacer driver and being programmed to;

a) start drilling the series of through holes with the drilling device and moving the drilling device along the drill track by the drill driver, b) start installing the spacers with the spacer device in predetermined through holes and moving the spacer device along the spacer track by the spacer driver when part of the series of through holes is drilled, c) continue the drilling of the series of through holes with the drilling device and the moving of the drilling device along the drill track until the series of through holes around the support beam is finished, and d) continue the installation of the spacers with spacer device in predetermined through holes and the moving of the spacer device along the spacer track until the predetermined number of through holes is reached.

In an embodiment of the cutting system, the drill track of the cutting system located in the operation position extends around the entire support beam.

In an embodiment of the cutting system, the drill track is defined by a drill guiding frame which guides the drilling device moved by the drill driver.

In an embodiment of the cutting system, the drill guiding frame of the cutting system located in the operation position extends around the entire support beam.

In an embodiment of the cutting system, the drilling device and the drill guiding frame are configured to drill the series of through holes around the entire support beam.

In an embodiment of the cutting system, the drill track is a circular track having a centre and the drilling device comprises multiple drills directed to the centre.

In an embodiment of the cutting system, the drilling device is configured to drill the series of through holes in an overlapping manner to create a continuous cut around the entire support beam.

In an embodiment of the cutting system, the drilling device comprises a first drilling unit configured to move along a first drill part of the drill track and a second drilling unit configured to move along a second drill part of the drill track. Having two drilling units speeds up the cutting time.

In an embodiment of the cutting system, the first drill part and the second drill part cover the entire drill track. This enables the drilling units to cover the entire circumference of the cylindrical support beam.

In an embodiment of the cutting system, the first drill part and the second drill part differ from each other or differ at least partly from each other.

In an embodiment of the cutting system, the cutting system comprises a drill storage to store at least one drilling unit, the drill storage is located at a drill distance from the drill track, and the drill guiding frame comprises a drill exchange section which is movable;

from a drill storage position in which the at least one drilling unit can be moved by the drill driver from the drill exchange section on the drill storage or can be moved by the drill driver from the drill storage on the drill exchange section, into a drill position in which the at least one drilling unit is positioned in the drill track, and vice versa.

In an embodiment of the cutting system, the drill guiding frame comprises a drill entrance section which is movable;

from a drill open position which allows the positioning of the cutting system such that the support beam is located within the drill track, into a drill closed position in which the complete drill guiding frame is positioned around the support beam, and vice versa.

In an embodiment of the cutting system, the drill entrance section is configured to be moved from the drill open position into the drill closed position, and vice versa, while supporting at least one drilling unit in order to move the at least one drilling unit along with the drill entrance section.

In an embodiment of the cutting system, the drill entrance section comprises at least one drill pivot part configured to pivot from the drill open position into the drill closed position, and vice versa.

In an embodiment of the cutting system, the drill entrance section comprises two drill pivot parts. An advantage of two drill pivot parts over one drill pivot part is a more compact construction. Two drill pivot parts will only extend outwards over half the distance compared to one drill pivot part.

In an embodiment of the cutting system, the first drilling unit and the second drilling unit each comprise multiple drills, preferably four drills. In such an embodiment, a predetermined number of drills may be provided for redundancy. A possible damaged drill may then be backed-up by a redundant drill.

In an embodiment of the cutting system, the spacer track of the cutting system located in the operation position extends around the entire support beam.

In an embodiment of the cutting system, the spacer track is defined by a spacer guiding frame which guides the spacer device moved by the spacer driver.

In an embodiment of the cutting system, the spacer guiding frame of the cutting system located in the operation position extends around the entire support beam.

In an embodiment of the cutting system, the spacer device and the spacer guiding frame are configured to install the number of spacers in through holes located around the entire support beam.

In an embodiment of the cutting system, the spacer device comprises a spacer supplier to supply spacers to the spacer device, and a spacer mover to move the supplied spacers in through holes.

In an embodiment of the cutting system, the cylindrical support beam comprises an upper beam part located above the series of through holes and a lower beam part located below the series of through holes and the spacers are configured to support the upper beam part when installed in through holes.

The spacers may be pins or wedges. A skilled person will understand that other types of spacers are also possible that have the same function.

In an embodiment of the cutting system, the spacer device comprises a first spacer unit configured to move along a first spacer part of the spacer track and a second spacer unit configured to move along a second spacer part of the spacer track.

In an embodiment of the cutting system, the first spacer part and the second spacer part cover the entire spacer track. This enables the spacer devices to cover the entire circumference of the cylindrical support beam.

In an embodiment of the cutting system, the first spacer part and the second spacer part differ from each other or differ at least partly from each other.

In an embodiment of the cutting system, the cutting system comprises a spacer storage to store at least one spacer unit, the spacer storage is located at a spacer distance from the spacer track, and the spacer guiding frame comprises a spacer exchange section which is movable;

from a spacer storage position in which the at least one spacer unit can be moved by the spacer driver from the spacer exchange section on the spacer storage or can be moved by the spacer driver from the spacer storage on the spacer exchange section, into a spacer position in which the at least one spacer unit is positioned in the spacer track, and vice versa.

In an embodiment of the cutting system, the spacer guiding frame comprises a spacer entrance section which is movable;

from a spacer open position which allows the positioning of the cutting system such that the support beam is located within the spacer track, into a spacer closed position in which the complete spacer guiding frame is positioned around the support beam, and vice versa.

In an embodiment of the cutting system, the spacer entrance section is configured to be moved from the spacer open position into the spacer closed position, and vice versa, while supporting at least one spacer unit in order to move the at least one spacer unit along with the spacer entrance section.

In an embodiment of the cutting system, the spacer entrance section comprise at least one spacer pivot part configured to pivot from the spacer open position into the spacer closed position, and vice versa.

In an embodiment of the cutting system, the drill guiding frame and the spacer guiding frame are integrated to form a single guiding frame.

In an embodiment of the cutting system, the fixating device comprises at least one clamping unit to clamp the fixating device to the outer wall of the support beam.

In an embodiment, the fixating device comprises a support frame which in the operation position surrounds the entire support beam and is provided with a frame entrance section which is movable;

from a frame open position which allows the positioning of the cutting system such that the support beam is partly surrounded by the support frame, into a frame closed position in which the support frame fully surrounds the support beam, and vice versa.

In an embodiment of the cutting system, the cutting system comprises a sawing device configured to saw through an internal object located inside the cylindrical support beam, and the sawing device comprises a sawing member extending through through holes drilled by the drilling device.

In an embodiment of the cutting system, the sawing device is movable along a sawing track from one side of the support beam to an opposite side of the support beam by a saw driver.

In an embodiment of the cutting system, the sawing member is located between the drilling device and the spacer device.

In an embodiment of the cutting system, the sawing member is a saw blade or a diamond wire.

In an embodiment of the cutting system, the cutting system comprises a control unit being in communication with the drilling device, the drill driver, the spacer device, the spacer driver, the sawing device, and the saw driver and being programmed to;

a) start drilling the series of through holes with the drilling device and moving the drilling device along the drill track by the drill driver, b) start sawing the internal object located inside the support beam with the sawing device and moving the sawing device along the saw track by the saw driver when part of the series of through holes is drilled and with the sawing member extending through through holes drilled by the drilling device, c) start installing the spacers with the spacer device in predetermined through holes and moving the spacer device along the spacer track by the spacer driver when the sawing device has been moved by the saw driver over a predetermined saw distance, d) continue the drilling of the series of through holes with the drilling device and the moving of the drilling device along the drill track until the series of through holes around the support beam is finished, e) continue the sawing of the internal object with the sawing device and the moving of the sawing device along the saw track until the sawing of the internal object is finished, f) continue the installation of the spacers in predetermined through holes with the spacer device and the moving of the spacer device along the spacer track until the predetermined number of through holes is reached.

The invention further relates to a method of cutting a hollow cylindrical support beam which forms part of a support structure of a sea platform, the method comprising the steps of:

a) providing a cutting system according to the invention, b) positioning the cutting system in the operation position around the support beam, c) fixating the cutting system in the operation position to the support beam, d) start drilling the series of through holes with the drilling device and moving the drilling device along the drill track by the drill driver, e) continue the drilling of the series of through holes with the drilling device and the moving of the drilling device along the drill track until the series of through holes around the support beam is finished.

In an embodiment of the method, the method comprises after step d) and prior to step e) starting installing the spacers with the spacer device in predetermined through holes and moving the spacer device along the spacer track by the spacer driver when part of the series of through holes is drilled, and after step e) continuing the installation of the spacers with spacer device in predetermined through holes and the moving of the spacer device along the spacer track until the predetermined number of through holes is reached.

In an embodiment of the method, the cutting system may be supported by a support vessel when the cutting system is positioned in the operation position.

In an embodiment of the method, the series of through holes are drilled around the entire cylindrical support beam.

In an embodiment of the method, the series of through holes are be drilled by multiple drills directed to the centre of the circular drill track. Using multiple drills at the same time is beneficial for the cutting time.

In an embodiment of the method, the series of through holes are drilled in an overlapping manner to create a continuous cut around the entire support beam.

In an embodiment of the method, the series of through holes are drilled by the first drilling unit moving along the first drill part of the drill track and the second drilling unit configured to move along the second drill part of the drill track.

In an embodiment of the method, the method comprises;

moving the drill exchange section of the drill guiding frame from the drill storage position into the drill position to move at least one drilling unit from the drill storage in the drill track, and/or moving the drill exchange section of the drill guiding frame from the drill position into the drill storage position to move at least one drilling unit from the drill track in the drill storage.

In an embodiment of the method, the method comprises;

moving the drill entrance section of the drill guiding frame into the drill open position and positioning the cutting system such that the support beam is located within the drill track, and moving the drill entrance section of the drill guiding frame into the drill closed position to position the complete drill guiding frame around the support beam.

In an embodiment of the method, the method comprises moving the drill entrance section of the drill guiding frame back into the drill open position and positioning the cutting system such that the support beam is located outside the drill track.

In an embodiment of the method, the method comprises moving the drill entrance section from the drill open position into the drill closed position, or vice versa, while supporting at least one drilling unit in order to move the at least one drilling unit together with the drill entrance section.

In an embodiment of the method, the moving of the drill entrance section comprises pivoting at least one drill pivot part from the drill open position into the drill closed position, and vice versa.

In an embodiment of the method, the method comprises installing the number of spacers in through holes located around the entire support beam.

In an embodiment of the method, the method comprises supplying spacers to the spacer device with the spacer supplier and moving the supplied spacer in one of the through holes with the spacer mover.

In an embodiment of the method, the method comprises supporting the upper beam of the support beam with spacers installed in through holes.

In an embodiment of the method, the spacers are installed by the first spacer unit moving along the first spacer part of the spacer track and the second spacer unit moving along the second spacer part of the spacer track.

In an embodiment of the method, the method comprises; moving the spacer exchange section of the spacer guiding frame from the spacer storage position into the spacer position to move at least one spacer unit from the spacer storage in the spacer track, and/or moving the spacer exchange section of the spacer guiding frame from the spacer position into the spacer storage position to move at least one spacer unit from the spacer track in the spacer storage.

In an embodiment of the method, the method comprises;

moving the spacer entrance section of the spacer guiding frame into the spacer open position and positioning the cutting system such that the support beam is located within the spacer track, and moving the spacer entrance section of the spacer guiding frame into the spacer closed position to position the complete spacer guiding frame around the support beam.

In an embodiment of the method, the method comprises moving the spacer entrance section of the spacer guiding frame back into the spacer open position and positioning the cutting system such that the support beam is located outside the spacer track.

In an embodiment of the method, the method comprises moving the spacer entrance section from the spacer open position into the spacer closed position, or vice versa, while supporting at least one spacer unit in order to move the at least one spacer unit along with the spacer entrance section.

In an embodiment of the method, the moving of the spacer entrance section comprises pivoting at least one spacer pivot part from the spacer open position into the spacer closed position, and vice versa.

In an embodiment of the method, the method comprises fixating the cutting system by clamping the fixating device to the outer wall of the support beam by clamping units.

In an embodiment of the method, the method comprises;

moving the frame entrance section of the support frame in the frame open position and positioning the cutting system such that the support beam is partly surrounded by the support frame, and moving the frame entrance section of the support frame in the frame closed position to fully surrounds the support beam with the support frame.

In an embodiment of the method, the method comprises sawing through the internal object located inside the cylindrical support beam with the sawing device having its sawing member extending through through holes drilled by the drilling device. So the through holes have the additional advantage of providing the required space for the saw.

In an embodiment of the method, the method comprises moving the sawing device along the sawing track from one side of the support beam to the opposite side of the support beam by the saw driver.

In an embodiment of the method, after the drilling of the series of through holes has started and before the installation of the spacers starts, the sawing of the internal object located inside the support beam with the sawing device is started and the sawing device is moved along the saw track by the saw driver, and wherein the sawing of the internal object with the sawing device and the moving of the sawing device along the saw track is continued until the sawing of the internal object is finished.

BRIEF DESCRIPTION OF THE DRAWINGS

The previous and other features and advantages of the cutting system and the method according to the invention will be more fully understood from the following detailed description of exemplary embodiments with reference to the attached drawings. Like reference numerals refer to like parts, and in which:

FIG. 1B schematically shows a perspective view of the cutting system of FIG. 1A while partly surrounding a support beam.

FIG. 2 schematically shows a perspective view of the cutting system of FIG. 1 fixated to the support beam in an operation position.

FIGS. 3-12 schematically show perspective views of the cutting system of FIG. 1 in operation.

FIG. 13 schematically shows a perspective view of the cylindrical support beam of FIG. 1B in a cut state.

FIGS. 14A-14G schematically show top views of operation steps sequence of the cutting device of FIG. 1.

DETAILED DESCRIPTION

Figure 1A:
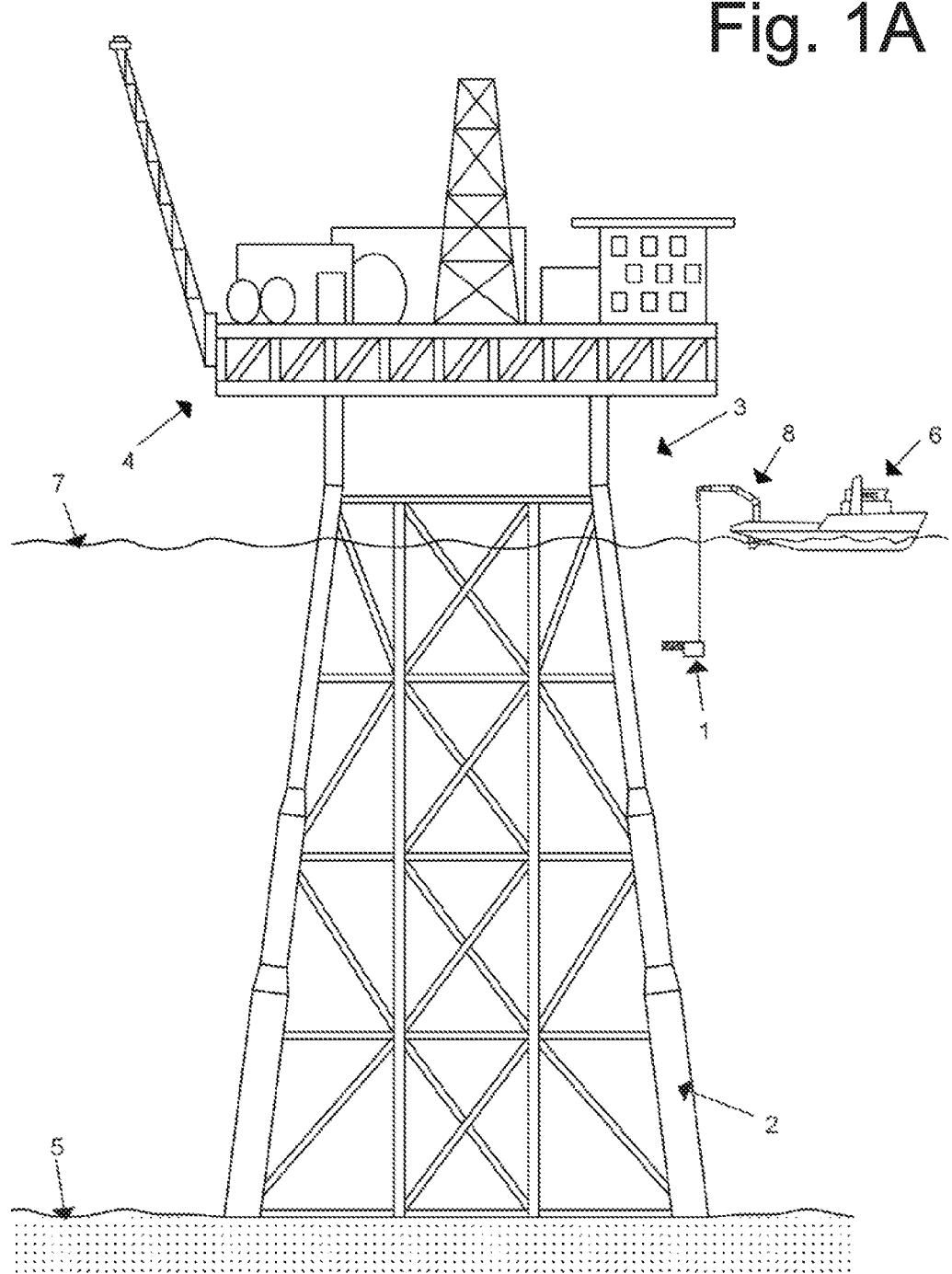
FIG. 1A schematically shows a side view of a support vessel and an embodiment of the cutting system according to the invention.

The FIGS. 1A and 1B show an embodiment of the cutting system 1 according to the invention. The cutting system 1 is suitable for cutting a hollow cylindrical support beam 2 which forms part of a support structure 3 of a sea platform 4. The support structure 3 is positioned on a seabed 5. The cutting system 1 is lowered from a support vessel 6 by a crane 8 and positioned near the support beam 2 of the support structure 3 (FIG. 1A). The cutting system 1 is subsequently positioned such that it partly surrounds the support beam 2 (FIG. 1B). The cutting system 1 operates below a water surface 7 and can also operate above the water surface 7.

In order to position the cutting system 1 such that it partly surrounds the support beam 2, an opening 13 is provided. The opening 13 is provided by two frame entrance sections 26, two drill entrance sections 58 and two spacer entrance sections 100 being in a respective frame open position 27, a drill open position 60 and a spacer open position 102. In an alternative embodiment of the cutting system 1, the cutting system 1 has only one frame entrance section 26, only one drill entrance section 58 and only one spacer entrance section 100. In the shown embodiment, the drill entrance sections 58 and the spacer entrance sections 100 are integrated.

The drill entrance sections 58 each have a drill pivot part 64. The drill pivot parts 64 pivot from the drill open position 60 (FIG. 2) into the drill closed position 62 (FIG. 3), and vice versa. In the embodiment as shown in the figures, two drill pivot parts 64 are provided. In an alternative embodiment of the cutting system 1, only one drill pivot part 64 is provided. An advantage of two pivot parts over one drill pivot part 64 is a compact construction. A skilled person will understand that only one drill pivot part 64 extends over substantially twice the distance compared to two drill pivot parts 64, in the drill open position 60 that is.

The spacer entrance sections 100 each have a spacer pivot part 106. The spacer pivot parts 106 pivot from the spacer open position 102 (FIG. 2) into the spacer closed position 104 (FIG. 3), and vice versa. In the embodiment as shown in the figures, two spacer pivot parts 106 are provided. In an alternative embodiment of the cutting system 1, only one spacer pivot part 106 is provided. An advantage of two pivot parts over one spacer pivot part 64 is a compact construction. A skilled person will understand that only one spacer pivot part 106 extends over substantially twice the distance compared to two spacer pivot parts 106, in the spacer open position 102 that is.

The cutting system 1 has a fixating device 20 for fixating the cutting system 1 in an operation position 11 around an outer wall 10 of the cylindrical support beam 2. Fixating the cutting system 1 to the support beam 2 in a stable manner is required to obtain a high cutting accuracy and speed.

The fixating device 20 has a support frame 24 which in the operation position 11 surrounds the entire support beam 2. The support frame 24 is provided with the two frame entrance sections 26 which are movable from the frame open position 27 (FIG. 1B) into a frame closed position 28 (FIG. 2), and vice versa. The support frame 24 fully surrounds the support beam 2 in the frame closed position 28.

Being in the frame closed position 28 as depicted in FIG. 2, two clamping units 22 are moved towards the outer wall 10 by their respective pushing members 23. The pushing member 23 allows the clamping unit 22 to push against the outer wall 10 of the cylindrical support beam 2. This way, a clamping action is created by the support frame 24 in closed position and the clamping units 22. The cutting system 1 is thereby fixated to the cylindrical support beam 2.

Turning to FIG. 3, also the drill entrance sections 58 and spacer entrance sections 100 are moved to their respective closed positions 62, 104. The closed position defines both a drill track 32 and a spacer track 72 which extend around the entire support beam 2 when the cutting system 1 is in the operation position 11. In the shown embodiment, the drill track 32 is a circular track having a centre 16 (FIG. 14A).

Cutting of the support beam 2 is done by drilling overlapping through holes 12 (FIG. 4B), thereby creating a continuous cut 9 around the support beam 2. The cutting system 1 is therefore provided with a drilling device 30. Said drilling device 30 comprises two drilling units 40, 44 which are configured to move along the drill track 32 and around the support beam 2. A first drilling unit 40 moves along a first drill part 42 of the drill track 32. A second drilling unit 44 moves along a second drill part 46 of the drill track 32. The first drill part 42 and the second drill part 46 cover the entire drill track 32. In an alternative embodiment of the cutting system 1, the first drill part 42 and the second drill part 46 differ from each other or differ at least partly from each other.

A drill driver 34 (FIG. 4B) drives the drilling device 30. Each drilling unit 40, 44 has four drills 38 (FIG. 8A) which are directed to the centre 16 when in the operation position 11. In an alternative embodiment of the cutting system 1, a different number of drills 38 are provided on each drilling unit 40, 44. The drills 38 drill a series of through holes 12 through the wall 10 and around the cylindrical support beam 2. A continuous cut 9 is thus created by drilling a series through holes 12 in an overlapping manner around the cylindrical support beam 2. The overlap is realised by moving each drilling unit 40, 44, after a through hole 12 is drilled, over a drill spacing 31 (FIG. 14B) on the drill track 32 that is less than a diameter 39 (FIG. 14B) of the drill 38 itself. A typical drill diameter is 150 mm, wherein the drill spacing is 140 mm. Due to the difference in distance, waste material is able to escape from the overlapping space. 150 mm drills 38 are widely available, providing a cost-efficient solution for the present invention.

Having two drilling units 40, 44 has a positive effect on the cutting speed. It also provides redundancy to the cutting system 1 in case the first drilling unit is unable to drill, for the second drilling unit 44 is also able to move along the first drill part 42, thereby being able to drill around the entire support beam 2. Further redundancy is obtained by providing multiple drills 38 to the first and second drilling unit 44. Not all four drills 38 need to be used simultaneously. It is also possible to use only one, two or three of the provided four drills 38.

The drill track 32 is also defined by a drill guiding frame 36. The drill guiding frame 36 guides the drilling units 40, 44 of the drilling device 30 that are moved by the drill driver 34. Also the drill guiding frame 36 extends around the entire support beam 2 when the cutting system 1 is in the operation position 11. The drill guiding frame 36 together with the drilling device 30 are configured to drill the series of through holes 12 around the entire support beam 2.

The two drill entrance sections 58 form part of the drill guiding frame 36. The drill entrance sections 58 are movable from the drill open position 60 into the drill closed position 62, and vice versa. The drill open position 60 allows the positioning of the cutting system 1 such that the support beam 2 is located within the drill track 32, as shown in FIG. 1B. In the drill closed position 62 the complete drill guiding frame 36 is positioned around the support beam 2, as shown in FIG. 3.

In the shown embodiment, the cutting system 1 is provided with a first spacer unit 82 and a second spacer unit 86. The two spacer units 82, 86 are part of the spacer device 70. Both spacer units 82, 86 are configured to move along a respective first spacer part 84 of the spacer track 72 and a second spacer part 88 of the spacer track 72. The first spacer part 84 and the second spacer part 88 cover the entire spacer track 72. In an alternative embodiment of the cutting system 1, the spacer parts differ from each other or differ at least partly from each other. The spacer units 82, 86 are movable by their respective spacer driver 74. Having two spacer units 82, 86 results in a high cutting speed, and provides redundancy to the cutting system 1. In addition, both spacer units 82, 86 are configured to install spacers 14 in a number of through holes 12.

In the operation and closed position as shown in FIG. 3, the spacer track 72 extends around the entire support beam 2. A spacer guiding frame 76 defines the spacer track 72 and is configured to guide the spacer units 82, 86. In the shown embodiment, also the spacer guiding frame 76 extends around the entire support beam 2 when located in the operation position 11. This enables the spacer units 82, 86 to move around the entire support beam 2. So the spacer guiding frame 76 together with the spacer device 70 are configured to install the number of spacers 14 in through holes 12 around the entire support beam 2.

In the shown embodiments, the drill guiding frame 36 is integrated with the spacer guiding frame 76 to form a single guiding frame. This provides a compact cutting system 1.

The spacer guiding frame 76 comprises two spacer entrance sections 100. The spacer entrance sections 100 are movable from the spacer open position 102 into the spacer closed position 104, and vice versa. The spacer open position 102 allows the positioning of the cutting system 1 such that the support beam 2 is located within the spacer track 72, as shown in FIG. 1B. In the spacer closed position 104 the complete spacer guiding frame 76 is positioned around the support beam 2, as shown in FIG. 3.

In an alternative embodiment of the cutting system 1, the spacer entrance sections 100 are also configured to each support a spacer unit 82, 86 while the spacer entrance section 100 moves from the spacer open position 102 into the spacer closed position 104, and vice versa. This way, the spacer units 82, 86 move along with the spacer entrance section 100.

Each spacer unit 82, 86 comprises a spacer supplier 78 for supplying spacers 14 in front of a spacer mover 80. A spacer mover 80 moves, e.g. pushes, the spacers 14 in the through holes 12. After each spacer 14 is installed, the spacer mover 80 retracts, thereby providing space for a next spacer 15 to be positioned in front of the spacer mover 80 by the spacer supplier 78. In the meantime the spacer unit 82, 86 is moved along its respective spacer part 84, 88 of the spacer track 72 and around the support beam 2 to a position at which the next spacer 14 is to be installed.

The spacers 14 are typically pins, or wedges. However, other configurations are also possible. In an alternative embodiment of the cutting system 1, the spacers 14 can be attached to small retrieval slings, which are in turn mounted on the cylindrical support beam 2 at one side of the cut 9. The retrieval slings prevent the spacers 14 from falling on the seabed, which is desirable from an environmental point of view. As the cylindrical support beam 2 has an upper beam part 108 located above the series of through holes 12 and a lower beam part 109 located below the series of through holes 12, the function of the spacers 14 is to provide vertical and horizontal support to the upper beam part 108.

Turning to FIGS. 4A and 4B, the cutting system 1 comprises a spacer storage 90 to store the spacer units 82, 86. The spacer storage 90 is located at a spacer distance 92 from the spacer track 72. A spacer exchange section 94, which is part of the spacer guiding frame 76, is movable from a spacer position 98 (FIG. 4A) to a spacer storage position 96 (FIG. 5), and vice versa. In the spacer storage position 96 a spacer unit is able to be moved by the spacer driver 74 from the spacer exchange section 94 onto the spacer storage 90 (FIG. 6), or vice versa. In the spacer position 98 a spacer unit is positioned in the spacer track 72, see FIG. 7A.

In an alternative embodiment of the cutting system 1, the cutting system 1 also comprises a drill storage 48 to store at least one drilling unit 82, 86. The drill storage 48 is located at a drill distance 50 from the drill track 32. The drill guiding frame 36 comprises a drill exchange section 52. Said drill exchange section 52 is movable from a drill position 56 into a drill storage position 54, and vice versa. In the drill storage position 54 a drilling unit 82, 86 is able to be moved by the drill driver 34 from the drill exchange section 52 onto the drill storage 48, or vice versa. In the drill position 56 a drilling unit is positioned in the drill track 32.

In the shown embodiment the cutting system 1 is provided with a sawing device 110. The sawing device 110 will generally be provided in case internal objects 160 are located inside the cylindrical support beam 2. Said sawing device 110 is configured to cut through the internal objects and comprises a sawing member 112. The sawing member 112 enters the inside of the cylindrical support beam 2 via through holes 12 that were drilled by the drilling device 30. The sawing member 112 in fact extends through the through holes 12.

During sawing the sawing device 110 moves along a sawing track 114 from one side of the support beam 2 to an opposite side of the support beam 2. A saw driver 116 moves the sawing device 110 along the sawing track 114.

In the shown embodiment wherein the drilling device 30, the spacer device 70 and the sawing device 110 are all provided with the cutting system 1, the sawing member 112 is located between the drilling device 30 and the spacer device 70. This enables a continuous operation of all three devices and tends to reduce the critical path.

The sawing member 112 is a saw blade. In an alternative embodiment of the cutting system 1, a diamond wire or any other member able to move through the through holes 12 and cut the internal objects 160 inside the cylindrical support beam 2 can be provided as sawing member 112.

In the shown embodiment including the sawing device 110, the control unit 150 is in wireless communication with the drilling device 30 and the drill driver 34, the spacer device 70 and the spacer driver 74, but also with the sawing device 110 and the sawing driver. Said control unit 150 is programmed to:

a) start drilling the series of through holes 12 with the drilling device 30 and moving the drilling device 30 along the drill track 32 by the drill driver 34, b) start sawing the internal object 160 located inside the support beam 2 with the sawing device 110 and moving the sawing device 110 along the saw track 114 by the saw driver 116 when part of the series of through holes 12 is drilled and with the sawing member 112 extending through through holes 12 drilled by the drilling device 30, c) start installing the spacers 14 with the spacer device 70 in predetermined through holes 12 and moving the spacer device 70 along the spacer track 72 by the spacer driver 74 when the sawing device 110 has been moved by the saw driver 116 over a predetermined saw distance, d) continue the drilling of the series of through holes 12 with the drilling device 30 and the moving of the drilling device 30 along the drill track 32 until the series of through holes 12 around the support beam 2 is finished, e) continue the sawing of the internal object 160 with the sawing device 110 and the moving of the sawing device 110 along the saw track until the sawing of the internal object 160 is finished, f) continue the installation of the spacers 14 in predetermined through holes 12 with the spacer device 70 and the moving of the spacer device 70 along the spacer track 72 until the predetermined number of through holes 12 is reached.

In the shown embodiment the control unit 150 is in wireless communication with both spacer units 82, 86. The control unit 150 is programmed to start the installation of the predetermined number of spacers 14 in a predetermined number of through holes 12 with the second spacer unit 86 first. The first spacer unit 82 starts installing the spacers after the second spacer unit 86 has progressed far enough to provide the required space for the first spacer unit 82. In order to determine how many spacers 14 need to be installed and in which through holes 12, calculations are made previous to and/or during cutting.

In an alternative embodiment of the cutting system 1, wherein no sawing device 110 is present, the control unit 150 is in wireless communication with the drilling device 30 and the drill driver 34, and with the spacer device 70 and the spacer driver 74. Said control unit 150 is programmed to:

a) start drilling the series of through holes 12 with the drilling device 30 and moving the drilling device 30 along the drill track 32 by the drill driver 34, b) start installing the spacers 14 with the spacer device 70 in predetermined through holes 12 and moving the spacer device 70 along the spacer track 72 by the spacer driver 74 when part of the series of through holes 12 is drilled, c) continue the drilling of the series of through holes 12 with the drilling device 30 and the moving of the drilling device 30 along the drill track 32 until the series of through holes 12 around the support beam 2 is finished, and d) continue the installation of the spacers 14 with spacer device 70 in predetermined through holes 12 and the moving of the spacer device 70 along the spacer track 72 until the predetermined number of through holes 12 is reached.

In yet another alternative embodiment, wherein no sawing device 110 and no spacer device 70 are present, a control unit 150 is in wireless communication with the drilling device 30 and the drill driver 34. The control unit 150 thus is in wireless communication with both drilling units 40, 44.

The control unit 150 is programmed to start drilling the series of through holes 12 with the drilling units 40, 44. It is furthermore programmed to move the drilling units 40, 44 along the drill track 32 by the drill driver 34 until the series of through holes 12 around the support beam 2 is finished.

Operation

In operation, the cutting system 1 is provided and lowered from the support vessel 6 by a crane 8, as shown in FIG. 1A. The cutting system 1 approaches the cylindrical support beam 2. During the approach an opening is provided which allows the positioning of the cutting system 1 such that the support beam 2 is located within the drill track 32, as shown in FIG. 1B. The opening 13 is realised by pivoting the drill pivot parts 64, the spacer pivot parts 106 and the support frame 24 to their respective open positions 60, 102, 27. In the shown embodiment, the drill pivot parts 64 and the spacer pivot parts 106 are integrated. The two drilling units 40, 44 are positioned on the guiding frame and in the drill track 32. The two spacer units 82, 86 are provided at the spacer storage 90.

When the cylindrical support beam 2 is positioned within the drill track 32, the support frame 24 of the fixating device 20 is moved from the frame open position 27 to the frame closed position 28, see FIG. 2. In the shown embodiment two frame entrance sections 26 pivot towards the cylindrical support beam 2 and interlock, thereby fully enclosing the support beam 2. This step is shown in FIG. 2.

FIG. 3 shows one of the two clamping units 22 engaging the outer wall 10 of the support beam 2. As the clamping units 22 are positioned at the opposite side of the support beam 2 relative to the frame entrance sections 26, the support beam 2 is pressed against the support frame 24 by the clamping units 22, see FIG. 3. The cutting system 1 is now fixated to the support beam 2.

A next step is shown in FIG. 3, wherein the pivot parts 64, 106 are moved to the closed position 62, 104. In an alternative embodiment of the cutting system 1, the pivot parts 64, 106 and the frame entrance sections 26 of the fixating device 20 are integrated. The cutting system 1 is now in the operation position 11.

The control unit 150 is in wireless communication with the drill driver 34 (FIG. 4A) and is programmed to start drilling when the cutting system 1 is in the operation position 11. The first drilling unit 40 starts drilling the first through hole 12 with the drill that is closest to the second drilling unit 44, and moves away from the second drilling unit 44 to subsequently drill a second through hole 12. After drilling a predetermined amount of through holes 12, the second drilling unit 44 moves towards the first drilling unit 40 to subsequently start drilling through holes 12. The first through hole 12 that the second drilling unit 44 drills, overlaps the first though hole 12 that the first drilling unit 40 has drilled. So the second drilling unit 44 starts drilling after the first drilling unit 40 has started. It is also possible to drill with more than one drill 38 on each drilling unit 40, 44, as four drills 38 are provided on each drilling unit 40, 44. The skilled person will understand that this will increase the total cutting speed.

Turning to FIGS. 4A and 4B, the drilling units 40, 44 have each progressed around the support beam 2. In case any internal objects 160 need to be cut as well, a sawing device 110 is provided on the cutting system 1. The sawing member 112 as shown in the figures is a sawing blade. When the drilling units 40, 44 have progressed such that there is enough space for the sawing member 112, the sawing member 112 enters the support beam 2 through the through holes 12. While sawing, the sawing device 110 moves along the sawing track 114 from one side of the support beam 2 to an opposite side of the support beam 2.

Turning to FIG. 5, the drilling units 40, 44 move further around the support beam 2, and the saw blade cuts through the internal objects 160. The next step is to install the spacers 14 with the spacer device 70 comprising the first and second spacer units 82, 86. Both spacer units 82, 86 are positioned at the spacer storage 90. The spacer exchange section 94 moves a spacer distance 92 from the spacer position 98 in the spacer track 72 to the spacer storage position 96.

Turning to FIG. 6, at the spacer storage position 96 the second spacer unit 86 moves from the spacer storage 90 onto the spacer exchange section 94. The spacer exchange section 94 with the second spacer unit 86 then moves to the spacer position 98 in which the second spacer unit 86 is positioned in the spacer track 72, as shown in FIGS. 7A and 7B. A first spacer 14 is installed.

As depicted in FIGS. 8A and 8B, the second spacer unit 86 has installed the first spacer 14 with the spacer mover 80 and subsequently moves clockwise around the support beam 2 when seen in top view, while installing a predetermined number of spacers 14 in a predetermined number of through holes 12. After a spacer 14 is installed, a new spacer 14 is supplied to the spacer mover 80 by the spacer supplier 78. When the second spacer unit 86 has moved off the spacer exchange section 94, the spacer exchange section 94 again moves to the spacer storage position 96 to pick up the first spacer unit 82. The first spacer unit 82 installs the spacers 14 on the opposite side of the support beam 2 relative to the second spacer unit 86.

The drilling units 40, 44 have drilled the series of through holes 12, thereby creating a continuous cut 9. After drilling the series of through holes 12 the drilling units 40, 44 are positioned on a respective drill pivot part 64. Each drill pivot part 64 with the drilling unit 40, 44 is then moved to the drill open position 60. This provides space for the sawing member 112 to move towards the end of the cut 9.

FIG. 9 shows the step wherein the sawing member 112 has been removed from the cutting system 1. The removal is necessary to provide space for the spacer units 82, 86 to install spacers 14. The first spacer unit 82 is positioned on the spacer exchange section 94. In an alternative embodiment of the cutting system 1, the second spacer unit 86 is at this point already positioned in the spacer track 72 and installing spacers 14.

FIGS. 10A and 10B show in particular the first spacer unit 82 being positioned in the spacer track 72. The first spacer unit 82 moves counter-clockwise around the support beam 2, when seen in top view, while installing a predetermined number of spacers 14 in a predetermined number of through holes 12. The skilled person will understand that it is also possible to move the first spacer unit 82 counter-clockwise and the second spacer unit 86 clockwise around the support beam 2.

In the shown embodiment of FIG. 11, the spacer units 82, 86 are only able to install spacers 14 up to where the drill pivot parts 64 are hingedly connected. In an alternative embodiment of the cutting system 1, the drill pivot parts 64 with the drilling units 40, 44 move to the drill closed position 62, after which the drilling units 40, 44 move away to provide space for a spacer unit. In this way, the spacers 14 can be installed around the entire support beam 2.

FIG. 12 shows a step wherein the spacer units 82, 86 move towards the spacer exchange section 94 after installing the predetermined number of spacers 14. The spacer units 82, 86 are positioned at a side of the support beam 2 opposite to the opening 13. The opening 13 is created by pivoting the frame entrance sections 26 to the frame open position 27. The final step is moving the cutting system 1 away from the support beam 2.

FIG. 13 shows the final result, wherein the spacers 14 remain in place after the cutting system 1 has been removed. Sequence FIGS. 14A-14G depict one of many possible operating sequences. A schematic top view is used to indicate the steps.

FIG. 14A shows the drilling of a first through hole 12. The frame entrance sections 26 and the clamping units 22 fixate the cutting system 1 to the cylindrical support beam 2. Two drilling units 40, 44, two spacer units 82, 86 and the sawing member 112 are shown. One drill 38 of the first drilling unit 40 starts drilling the first through hole 12. A black dot indicates that the through hole 12 is drilled with the first drilling unit 40.

In the shown embodiment, only one of the four drills 38 on each drilling unit are used. The skilled person will understand that other configurations are also possible, wherein the use of more drills 38 at the same time has a positive effect on the cutting speed of the cutting system 1. In the shown embodiment, three of the four drills 38 on each drilling unit 40, 44 are provided for redundancy.

FIG. 14B depicts the next step, wherein the first drilling unit 40 moves counter-clockwise in order to drill a second through hole 12. After drilling a predetermined number of through holes 12, in the shown embodiment after the third through hole 12, the second drilling unit 44 moves counter-clockwise and towards the first drilling unit 40. This step is shown in FIG. 14C. From this point onwards both drilling units 40, 44 will be drilling. An unfilled circle indicates that the through hole 12 is drilled with the second drilling unit 44.

FIG. 14D depicts the opposite movement of the two drilling units 40, 44. The dashed line indicates the continuous cut 9 due to the overlapping through holes 12.

Figure 14G:
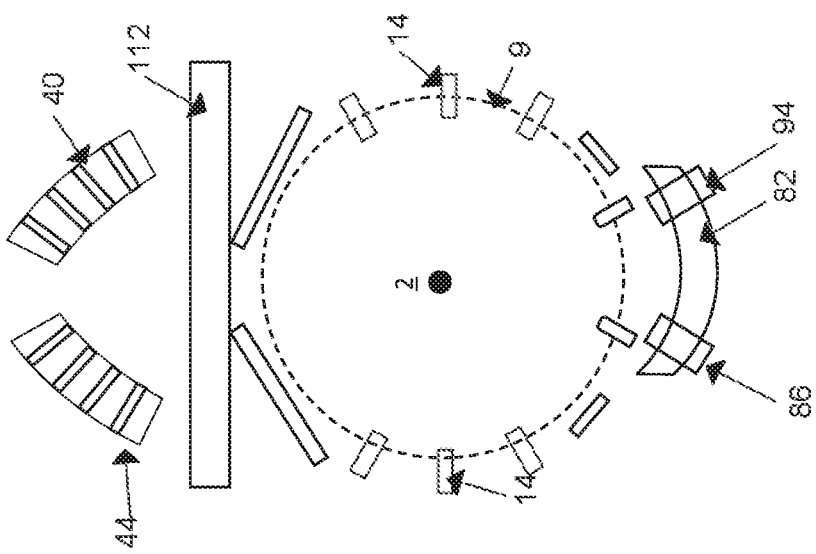
Figure 14F:
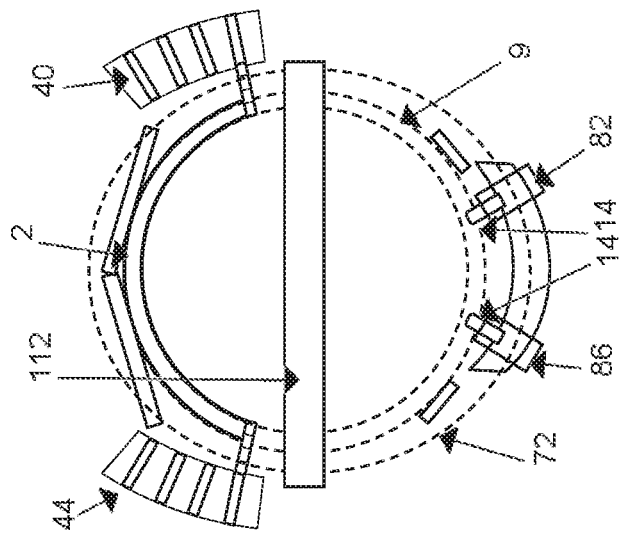
Figure 14E:
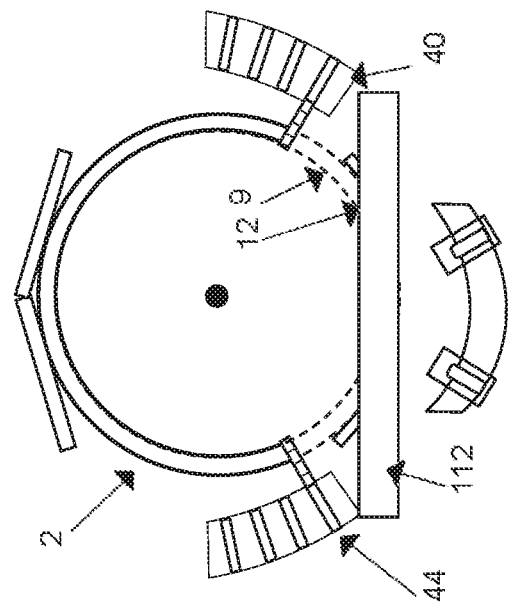

In FIG. 14E both drilling units 40, 44 have progressed such that the sawing member 112 is able to enter the cylindrical support beam 2 through the through holes 12.

The spacer units 82, 86 are positioned in the spacer track 72, as shown in FIG. 14F. The spacers 14 are installed. The sawing member 112 and both drilling units 40, 44 have progressed and provide space for the spacer units 82, 86 to move along the spacer track 72 around the cylindrical support beam 2.

FIG. 14G shows a step wherein the predetermined number of spacers 14 are installed around the support beam 2. The spacer units 82, 86 has moved back on the spacer exchange section 94 and the sawing member 112 is in a position in which it can be removed. The drilling units 40, 44 are positioned at an opposite side of the support beam 2 relative to the spacer units 82, 86. In a final step the sawing member 112 is removed and the drilling units 40, 44 are positioned such that the cutting system 1 can be removed.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Furthermore, the terms and phrases used herein are not intended to be limiting, but rather, to provide an understandable description of the invention.

The terms "a" or "an", as used herein, are defined as one or more than one. The term another or subsequent, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. A cutting system for cutting a hollow cylindrical support beam which forms part of a support structure of a sea platform, wherein the cutting system comprises:
    a fixating device to fixate the cutting system in an operation position around an outer wall of the support beam;
    a drilling device to drill a series of through holes in the outer wall and around the support beam, which drilling device is movable by a drill driver along a drill track which extends around the support beam; and
    a spacer device configured to install spacers in a number of the through holes, which spacer device is movable along a spacer track by a spacer driver.

2. The cutting system according to claim 1, wherein the cutting system comprises a control unit being in communication with the drilling device and the drill driver, and being programmed to start drilling the series of through holes with the drilling device and moving the drilling device along the drill track by the drill driver until the series of through holes around the support beam is finished.

3. The cutting system according to claim 1, wherein the cutting system comprises a control unit being in communication with the drilling device, the drill driver, the spacer device, and the spacer driver and being programmed to:
    a) start drilling the series of through holes with the drilling device and moving the drilling device along the drill track by the drill driver,
    b) start installing the spacers with the spacer device in predetermined through holes and moving the spacer device along the spacer track by the spacer driver when part of the series of through holes is drilled,
    c) continue the drilling of the series of through holes with the drilling device and the moving of the drilling device along the drill track until the series of through holes around the support beam is finished, and
    d) continue the installation of the spacers with spacer device in predetermined through holes and the moving of the spacer device along the spacer track until the predetermined number of through holes is reached.

4. The cutting system according to claim 1, wherein the drill track of the cutting system located in the operation position extends around the entire support beam.

5. The cutting system according to claim 1, wherein the drill track is defined by a drill guiding frame which guides the drilling device moved by the drill driver.

6. The cutting system according to claim 5, wherein the drill guiding frame comprises a drill entrance section which is movable:
    from a drill open position which allows the positioning of the cutting system such that the support beam is located within the drill track,
    into a drill closed position in which the complete drill guiding frame is positioned around the support beam, and vice versa.

7. The cutting system according to claim 1, wherein the drilling device is configured to drill the series of through holes in an overlapping manner to create a continuous cut around the entire support beam.

8. The cutting system according to claim 1, wherein the drilling device comprises a first drilling unit configured to move along a first drill part of the drill track and a second drilling unit configured to move along a second drill part of the drill track.

9. The cutting system according to claim 1, where the cutting system comprises a drill storage to store at least one drilling unit, the drill storage is located at a drill distance from the drill track, and the drill guiding frame comprises a drill exchange section which is movable:

from a drill storage position in which the at least one drilling unit can be moved by the drill driver from the drill exchange section on the drill storage or can be moved by the drill driver from the drill storage on the drill exchange section, into a drill position in which the at least one drilling unit is positioned in the drill track, and vice versa.

10. The cutting system according to claim 1, wherein the spacer device comprises a first spacer unit configured to move along a first spacer part of the spacer track and a second spacer unit configured to move along a second spacer part of the spacer track.

11. The cutting system according to claim 10, wherein the cutting system comprises a spacer storage to store at least one spacer unit, the spacer storage is located at a spacer distance from the spacer track, and the spacer guiding frame comprises a spacer exchange section which is movable:

from a spacer storage position in which the at least one spacer unit can be moved by the spacer driver from the spacer exchange section on the spacer storage or can be moved by the spacer driver from the spacer storage on the spacer exchange section, into a spacer position in which the at least one spacer unit is positioned in the spacer track, and vice versa.

12. The cutting system according to claim 1, wherein the cutting system comprises a sawing device configured to saw through an internal object located inside the cylindrical support beam, and the sawing device comprises a sawing member extending through through holes drilled by the drilling device.

13. The cutting system according to claim 12, wherein the sawing device is movable along a sawing track from one side of the support beam to an opposite side of the support beam by a saw driver.

14. The cutting system according to claim 12, wherein the cutting system comprises a control unit being in communication with the drilling device, the drill driver, the spacer device, the spacer driver, the sawing device, and the saw driver and being programmed to:

a) start drilling the series of through holes with the drilling device and moving the drilling device along the drill track by the drill driver, b) start sawing the internal object located inside the support beam with the sawing device and moving the sawing device along the saw track by the saw driver when part of the series of through holes is drilled and with the sawing member extending through through holes drilled by the drilling device, c) start installing the spacers with the spacer device in predetermined through holes and moving the spacer device along the spacer track by the spacer driver when the sawing device has been moved by the saw driver over a predetermined saw distance, d) continue the drilling of the series of through holes with the drilling device and the moving of the drilling device along the drill track until the series of through holes around the support beam is finished, e) continue the sawing of the internal object with the sawing device and the moving of the sawing device along the saw track until the sawing of the internal object is finished, and f) continue the installation of the spacers in predetermined through holes with the spacer device and the moving of the spacer device along the spacer track until the predetermined number of through holes is reached.

\* \* \* \* \*